United States Patent
Nishida et al.

(10) Patent No.: US 9,663,050 B2
(45) Date of Patent: May 30, 2017

(54) VEHICLE BODY FRONT SECTION STRUCTURE

(71) Applicant: TOYOTA JIDOSHA KABUSHIKI KAISHA, Toyota-shi (JP)

(72) Inventors: Gen Nishida, Aichi-gun (JP); Nobuaki Matsui, Miyoshi (JP); Reiji Iwaihara, Toyota (JP); Tatsuya Ayukawa, Toyota (JP); Tsutomu Hamabe, Nissin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/763,323

(22) PCT Filed: Jan. 8, 2014

(86) PCT No.: PCT/JP2014/050169
§ 371 (c)(1),
(2) Date: Jul. 24, 2015

(87) PCT Pub. No.: WO2014/115580
PCT Pub. Date: Jul. 31, 2014

(65) Prior Publication Data
US 2015/0360632 A1    Dec. 17, 2015

(30) Foreign Application Priority Data

Jan. 25, 2013  (JP) .................................. 2013-012621
Jan. 25, 2013  (JP) .................................. 2013-012622

(51) Int. Cl.
*B60R 19/34*    (2006.01)
*B62D 21/15*    (2006.01)
(Continued)

(52) U.S. Cl.
CPC .............. *B60R 19/34* (2013.01); *B60R 19/12* (2013.01); *B62D 21/152* (2013.01); *B62D 25/082* (2013.01); *F16F 7/12* (2013.01)

(58) Field of Classification Search
CPC . B60R 19/34; B60R 2021/0025; B60R 19/12; F16F 7/12; B62D 21/152; B62D 25/082
(Continued)

(56) References Cited

U.S. PATENT DOCUMENTS 7,147,275 B2 *  12/2006  Matsuyama .........  B62D 25/088
                                                                296/187.09
2003/0025358 A1   2/2003  Taguchi et al.
(Continued)

FOREIGN PATENT DOCUMENTS

CN  102137787 A   7/2011
EP  2 330 018 A1  6/2011
(Continued)

OTHER PUBLICATIONS

International Search Report issued Mar. 4, 2014, in PCT/JP2014/050169, filed Jan. 8, 2014.
(Continued)

*Primary Examiner* — Joseph D Pape
*Assistant Examiner* — Dana Ivey
(74) *Attorney, Agent, or Firm* — Oblon, McClelland, Maier & Neustadt, L.L.P.

(57) ABSTRACT

A vehicle body front section structure capable of suppressing deformation of a vehicle body in a small overlap collision is obtained. A vehicle body front section structure includes a front side member with a crash box attached to a vehicle front end, a coupling member that is interposed between and joined to the crash box and the front side member at a vehicle front end side, and that is joined to a fender apron section at a vehicle rear end, and a spacer that
(Continued)

is disposed at a portion overlapping with the front side member in a vehicle vertical direction between the front side member and the coupling member.

5 Claims, 23 Drawing Sheets

(51) Int. Cl.
    *B62D 25/08*     (2006.01)
    *F16F 7/12*     (2006.01)
    *B60R 19/12*     (2006.01)

(58) Field of Classification Search
    USPC .................................................... 296/187.09
    See application file for complete search history.

(56) References Cited

U.S. PATENT DOCUMENTS

| | | |
|---|---|---|
| 2005/0077711 A1 | 4/2005 | Yasui et al. |
| 2007/0176443 A1 | 8/2007 | Yasuhara et al. |
| 2010/0127531 A1 | 5/2010 | Yasuhara et al. |
| 2010/0259033 A1 | 10/2010 | Okabe et al. |
| 2012/0248820 A1 | 10/2012 | Yasui et al. |
| 2013/0241233 A1 | 9/2013 | Ohnaka et al. |
| 2013/0249245 A1 | 9/2013 | Sekiguchi et al. |

FOREIGN PATENT DOCUMENTS

| | | |
|---|---|---|
| EP | 2 415 643 A1 | 2/2012 |
| JP | 2003-40142 A | 2/2003 |
| JP | 2004-314899 A | 11/2004 |
| JP | 2005-112173 A | 4/2005 |
| JP | 2005-231435 A | 9/2005 |
| JP | 2005-231436 A | 9/2005 |
| JP | 2007-190964 A | 8/2007 |
| JP | 2009-154859 A | 7/2009 |
| JP | 2009-171032 A | 7/2009 |
| JP | 2010-125884 A | 6/2010 |
| JP | 2010-132122 A | 6/2010 |
| JP | 2010-184706 A | 8/2010 |
| JP | 2012-166743 A | 9/2012 |
| JP | 2012-214211 A | 11/2012 |
| JP | 2013-193572 A | 9/2013 |
| JP | 2013-199233 A | 10/2013 |

OTHER PUBLICATIONS

English Translation of Response to Written Opinion Issued in PCT/JP2014/050169, filed Jan. 8, 2014.

Office Action issued Aug. 31, 2016 in Chinese Patent Application No. 201480011293.1.

Extended European Search Report issued Jul. 8, 2016 in Patent Application No. 14742925.2.

* cited by examiner

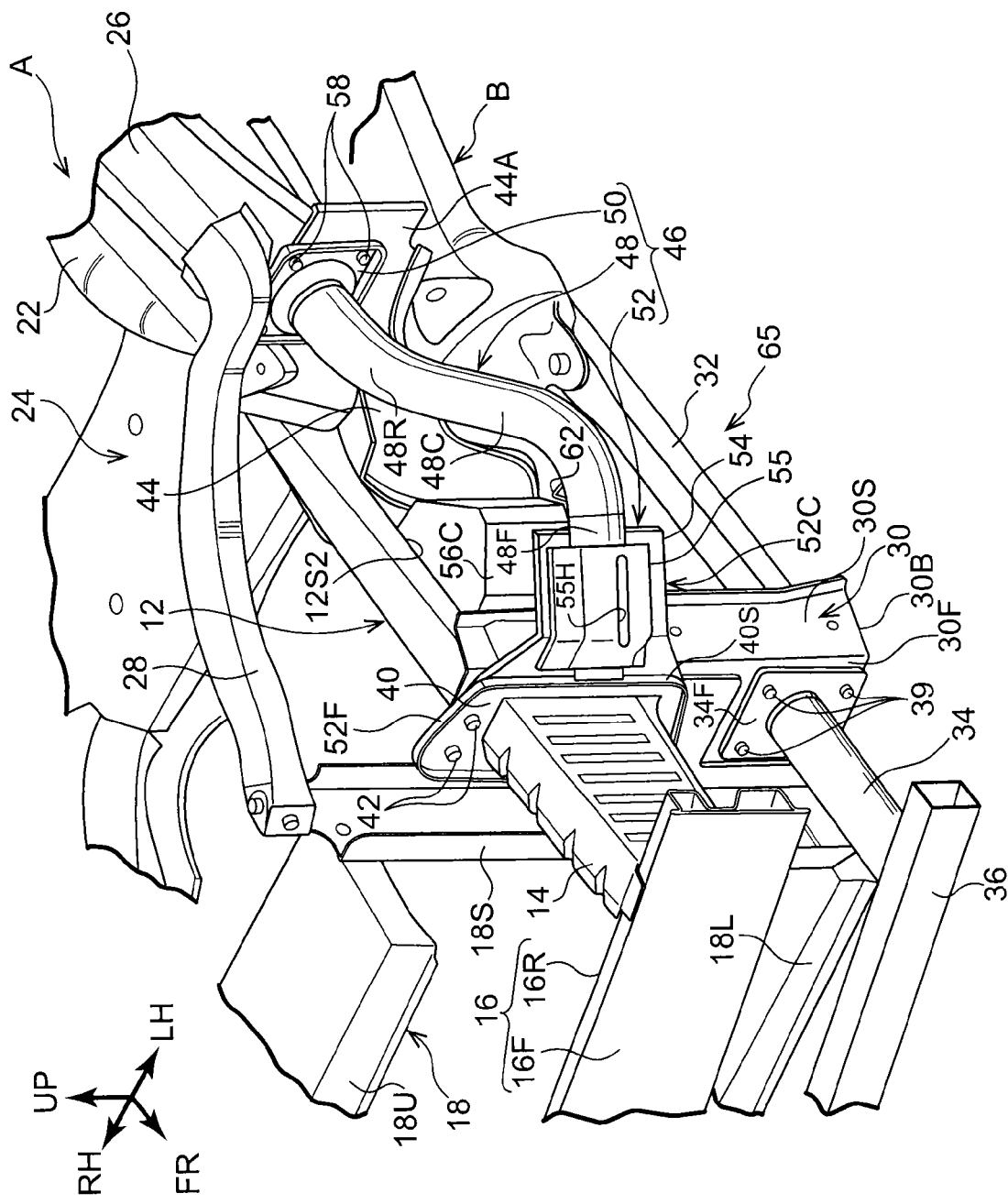

VEHICLE BODY FRONT SECTION STRUCTURE

TECHNICAL FIELD

The present invention relates to a vehicle body front section structure.

BACKGROUND ART

Structures are known in which a coupling member is attached to a front end portion of apron reinforcement, and a face portion attached to a front end of the coupling member is interposed between and fastened together with a front side frame and a crash can (for example, see Japanese Patent Application Laid-Open (JP-A) No. 2005-231435).

SUMMARY OF INVENTION

Technical Problem

In the above configuration, a load transmission path is formed to transmit load input to the face portion through the coupling member to the apron reinforcement in a small overlap collision. However, configurations which load is simply transmitted toward the vehicle rear leave room for improvement from the perspective of suppressing cabin deformation in a small overlap collision.

An object of the present invention is to obtain a vehicle body front section structure capable of suppressing deformation of a vehicle body in a small overlap collision.

Solution to Problem

A vehicle body front section structure according to a first aspect of the present invention includes: a front side member, with a crash box attached to a vehicle longitudinal direction front side; a coupling member that is interposed between and joined to the crash box and the front side member at a vehicle longitudinal direction front side, and that is joined to a fender apron section at a vehicle longitudinal direction rear side; and a spacer that is disposed overlapping with the front side member and the coupling member in a vehicle vertical direction at a portion positioned between the front side member and the coupling member in plan view.

According to the above aspect, collision load is input to the coupling member in, for example, a frontal collision mode in which load is input at the vehicle width direction outside of the front side member (referred to below as a "small overlap collision"). When the coupling member undergoes deformation or displacement under this load, a front end portion of the front side member is pulled toward the vehicle width direction outside since a front end side of the coupling member is interposed between and joined to the crash box and the front side member. Moreover, the front side member is pushed toward the vehicle width direction inside by the spacer positioned between the coupling member and the front side member accompanying the deformation or displacement of the coupling member described above. The front side member accordingly folds, and the vehicle and its collision counterpart are displaced in the vehicle width direction, thereby suppressing the collision counterpart from intruding into the vehicle body of the vehicle.

The vehicle body front section structure of the above aspect can accordingly suppress deformation of the vehicle body in a small overlap collision.

In the above aspect, configuration may be made wherein the spacer is provided at a vehicle width direction outside side portion of the front side member.

According to the above aspect, the spacer is provided to the front side member, such that a specific location of the front side member (the installation location) is pushed toward the vehicle width direction inside by the spacer in a small overlap collision. The front side member can accordingly be folded at an appropriate location in a small overlap collision.

In the above aspect, configuration may be made wherein the coupling member includes a horizontal portion extending along the length direction of the front side member from a portion interposed between the crash box and the front side member toward the vehicle longitudinal direction rear as viewed from the side so as to overlap with the front side member and the spacer in the vehicle vertical direction.

According to the above aspect, the horizontal portion of the coupling member extends from the portion of the coupling member interposed between the crash box and the front side member toward the rear, namely, substantially horizontally. The spacer transmits load from the horizontal portion as force to push the front side member toward the vehicle width direction inside. Since the horizontal portion extends substantially in the horizontal direction as described above, when collision load is transmitted to the spacer, namely to the front side member, component force is suppressed from arising in the vehicle vertical direction. This thereby enables collision load to be efficiently transmitted to the front side member.

In the above aspect, configuration may be made wherein the coupling member is configured including a main body extending from the fender apron section toward a vehicle longitudinal direction front side portion of the front side member, and a joining plate that is joined to a vehicle longitudinal direction front side of the main body, and is interposed between and joined to the crash box and the front side member; and an opposing face portion is formed at a location of the joining plate that is joined to the main body, such that the opposing face portion juts out in the vehicle vertical direction with respect to the main body and opposes the spacer while overlapping with the spacer in the vehicle vertical direction.

According to the above aspect, the opposing face portion that juts out in the vehicle vertical direction with respect to the main body at the joining plate opposes the spacer, thereby enabling load to be transmitted through the spacer to the front side member over a wider range in the vehicle vertical direction. Namely, collision load can be efficiently transmitted to the front side member.

In the above aspect, configuration may be made wherein: the coupling member is configured including a main body extending from the fender apron section toward a vehicle longitudinal direction front side portion of the front side member, and a joining plate that is joined to a vehicle longitudinal direction front side of the main body, and is interposed between and joined to the crash box and the front side member; a horizontal portion, extending along the length direction of the front side member from a portion interposed between the crash box and the front side member toward the vehicle longitudinal direction rear as viewed from the side so as to overlap with the front side member and the spacer in the vehicle vertical direction, is configured including a vehicle longitudinal direction front side portion of the main body; an opposing face portion is formed to a location of the joining plate that is joined to the main body, such that the opposing face portion juts out in the vehicle vertical direction with respect to the main body and opposes the spacer while overlapping with the spacer in the vehicle vertical direction; and the joining plate includes a pair of plate portions that sandwich the horizontal portion, and the pair of plate portions are respectively joined to the horizontal portion by arc welding.

According to the above aspect, the pair of plate portions that sandwich the horizontal portion of the main body are respectively joined to the horizontal portion by arc welding, thus firmly joining the joining plate and the main body together. Accordingly, the action of the coupling member to pull the front end side of the front side member toward the vehicle width direction outside is effectively exhibited in a small overlap collision.

In the above aspect, configuration may be made wherein the spacer projects out to the vehicle width direction outside of the front side member, and further including a support member that supports the spacer from the vehicle longitudinal direction rear as the spacer undergoes displacement or deformation toward the vehicle longitudinal direction rear together with the coupling member when load toward the vehicle longitudinal direction rear acts on the spacer from the coupling member.

According to the above aspect, due to providing the support member, the spacer is supported from the vehicle rear by the support member when the coupling member undergoes deformation or displacement and pushes the front side member through the spacer.

A vehicle body front section structure according to a second aspect of the present invention includes a front side member, with a crash box attached to a vehicle longitudinal direction front side; a coupling member that is interposed between and joined to the crash box and the front side member at a vehicle longitudinal direction front side, and that is joined to a fender apron section at a vehicle longitudinal direction rear side; a spacer that projects out to the vehicle width direction outside of the front side member, and that is provided to the front side member so as to overlap with a portion of the coupling member, and with the front side member, in the vehicle vertical direction; and a support member that supports the spacer from the vehicle longitudinal direction rear as the spacer undergoes displacement or deformation toward the vehicle longitudinal direction rear together with the coupling member when load toward the vehicle longitudinal direction rear acts on the spacer from the coupling member.

According to the above aspect, collision load is input to the coupling member in, for example, a frontal collision mode in which load is input at the vehicle width direction outside of the front side member (referred to below as a "small overlap collision"). When the coupling member undergoes deformation or displacement under this load, a front end portion of the front side member is pulled toward the vehicle width direction outside since a front end side of the coupling member is interposed between and joined to the crash box and the front side member. Moreover, the front side member is pushed toward the vehicle width direction inside by the spacer positioned between the coupling member and the front side member accompanying the deformation or displacement of the coupling member described above. The front side member accordingly folds, and the vehicle and its collision counterpart are displaced in the vehicle width direction, thereby suppressing the collision counterpart from intruding into the vehicle body of the vehicle.

The vehicle body front section structure of the above aspect can accordingly suppress deformation of the vehicle body in a small overlap collision. Moreover, due to providing the support member, the spacer is supported by the support member from the vehicle rear when the coupling member undergoes deformation or displacement and pushes the front side member through the spacer.

In the above aspect, configuration may be made wherein the support member is configured including a projection portion that projects out from the coupling member toward a vehicle longitudinal direction rear portion of the spacer.

According to the above aspect, the spacer is supported from the vehicle rear by the projection portion provided to the coupling member when the coupling member undergoes deformation or displacement and pushes the front side member through the spacer. Namely, (a portion moving integrally together with) the coupling member pushes the front side member through the spacer while supporting the spacer from the vehicle rear. The spacer can accordingly be supported while eliminating, or suppressing to a small level, any detriment to collision performance in a small overlap collision.

A vehicle body front section structure of a third aspect of the present invention includes a front side member, with a crash box attached to a vehicle longitudinal direction front side; a coupling member that is interposed between and joined to the crash box and the front side member at a vehicle longitudinal direction front side, with a vehicle longitudinal direction rear side of the coupling member joined to a fender apron section, and with an angled portion that is configured by a vehicle longitudinal direction front side of a portion of the coupling member positioned on the vehicle width direction outside of the front side member, and that is angled such that a rear side of the angled portion is separated further to the vehicle width direction outside of the front side member than a vehicle longitudinal direction front side of the angled portion in plan view; a spacer that projects out to the vehicle width direction outside of the front side member, and that is provided to the front side member so as to overlap with a portion of the coupling member, and with the front side member, in the vehicle vertical direction; and a projection portion that projects out from the angled portion of the coupling member toward a vehicle longitudinal direction rear portion of the spacer.

According to the above aspect, collision load is input to the coupling member in, for example, a frontal collision mode in which load is input at the vehicle width direction outside of the front side member (referred to below as a "small overlap collision"). When the coupling member undergoes deformation or displacement under this load, a front end portion of the front side member is pulled toward the vehicle width direction outside since a front end side of the coupling member is interposed between and joined to the crash box and the front side member. Moreover, the front side member is pushed toward the vehicle width direction inside by the spacer positioned between the coupling member and the front side member accompanying the deformation or displacement of the coupling member described above. The front side member accordingly folds, and the vehicle and its collision counterpart are displaced in the vehicle width direction, thereby suppressing the collision counterpart from intruding into the vehicle body of the vehicle.

The vehicle body front section structure of the above aspect can accordingly suppress deformation of the vehicle body in a small overlap collision. Moreover, in a small overlap collision, the angled portion of the coupling member undergoes deformation or displacement so as to rotate about a portion joined to the front end of the front side member in plan view. Accompanying this action, the projection portion projecting out from the angled portion moves (swings around) to the vehicle rear of the spacer. The projection portion supports the spacer from the vehicle rear.

In the above aspect, configuration may be made wherein in the coupling member, a vehicle longitudinal direction front side of a portion positioned on the vehicle width direction outside of the front side member configures an angled portion that is angled such that a rear side of the angled portion is separated further to the vehicle width direction outside of the front side member than a vehicle longitudinal direction front side of the angled portion in plan view, and further including a projection portion that projects out from the angled portion of the coupling member toward a vehicle longitudinal direction rear portion of the spacer.

According to the above aspect, in a small overlap collision, the angled portion of the coupling member undergoes deformation or displacement so as to rotate about a portion joined to the front end of the front side member in plan view. Accompanying this action, the projection portion projecting out from the angled portion moves (swings around) to the vehicle rear of the spacer. The projection portion supports the spacer from the vehicle rear.

In the above aspect, configuration may be made wherein the projection portion and the coupling member are disposed at a separation to the spacer.

According to the above aspect, the projection portion and the coupling member are separated from the spacer. Accordingly, in a collision mode other than a small overlap collision, such as a full overlap frontal collision, restraint or obstruction of the behavior of the spacer, namely the front side member, by the support member and the coupling member is prevented or effectively suppressed.

In the above aspect, configuration may be made wherein the projection portion is integrally formed to the coupling member by bending a portion of the coupling member.

According to the above aspect, the projection portion is formed by bending the coupling member, thereby enabling the projection portion (support member) to be provided without entailing an increase in the number of components.

Advantageous Effects of Invention

As explained above, a vehicle body front section structure according to the present invention exhibits the excellent advantageous effect of enabling deformation of a vehicle body to be suppressed in a small overlap collision.

BRIEF DESCRIPTION OF DRAWINGS

FIG. 9 is an enlarged perspective view illustrating relevant portions of a vehicle body front section structure according to a second exemplary embodiment of the present invention.

DESCRIPTION OF EMBODIMENTS

First Exemplary Embodiment

Figure 1:
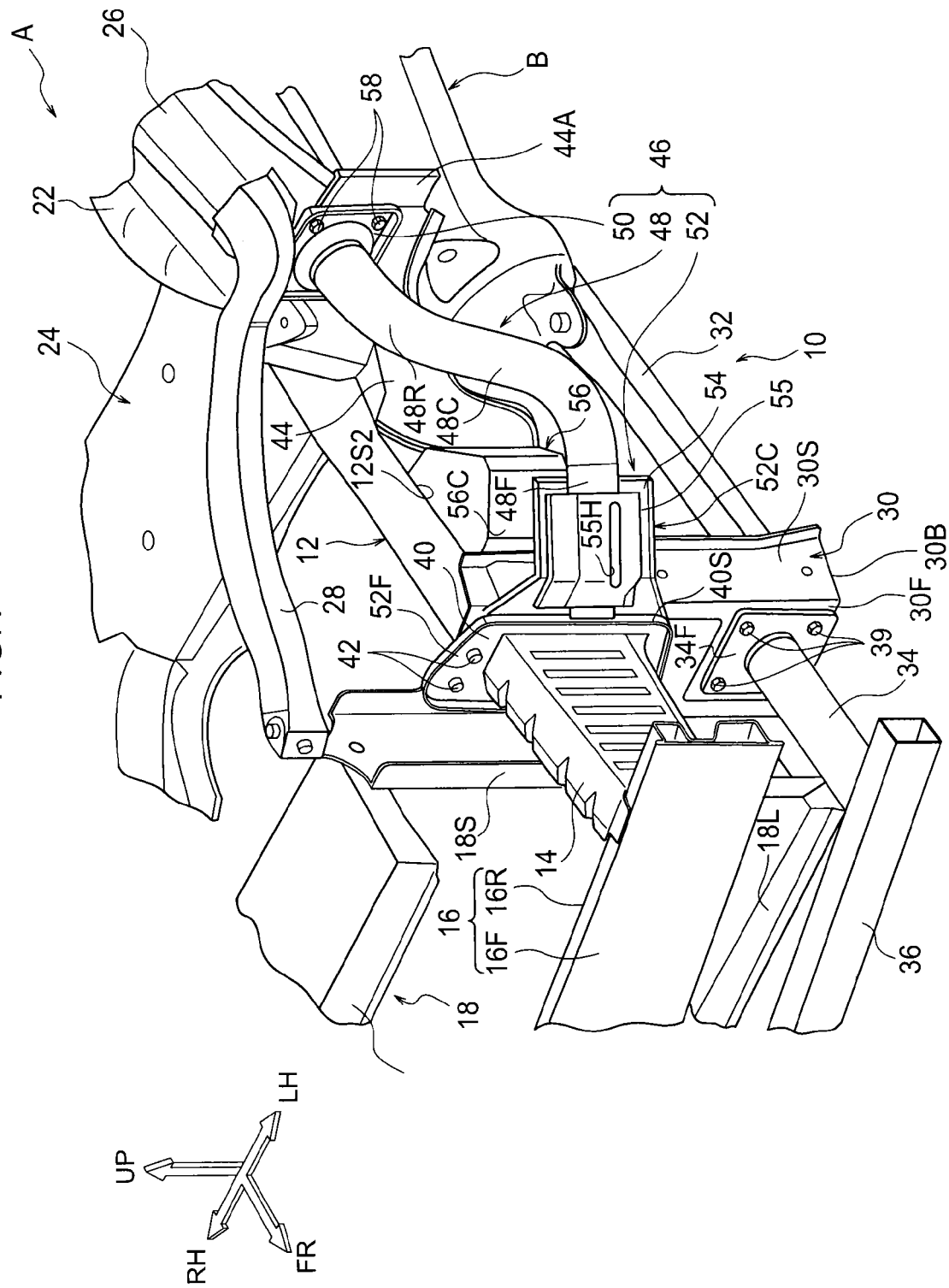
FIG. 1 is an enlarged perspective view illustrating relevant portions of a vehicle body front section structure according to a first exemplary embodiment of the present invention.

Explanation follows regarding a vehicle body front section structure 10 according to a first exemplary embodiment of the present invention, with reference to FIG. 1 to FIG. 8. In the drawings, the arrow FR indicates the front direction in the vehicle longitudinal direction, the arrow UP indicates the upward direction in the vehicle vertical direction, the arrow RH indicates the right hand (one vehicle width direction) side when facing in the front direction, and the arrow LH indicates the left hand (the other vehicle width direction) side when facing in the front direction, as appropriate. In the following explanation, unless specifically stated otherwise, the longitudinal, vertical, and lateral directions refer to front and rear in the vehicle longitudinal direction, up and down in the vehicle vertical direction, and left and right when facing in the direction of travel.

Basic Configuration of Vehicle Body Front Section

Figure 2:
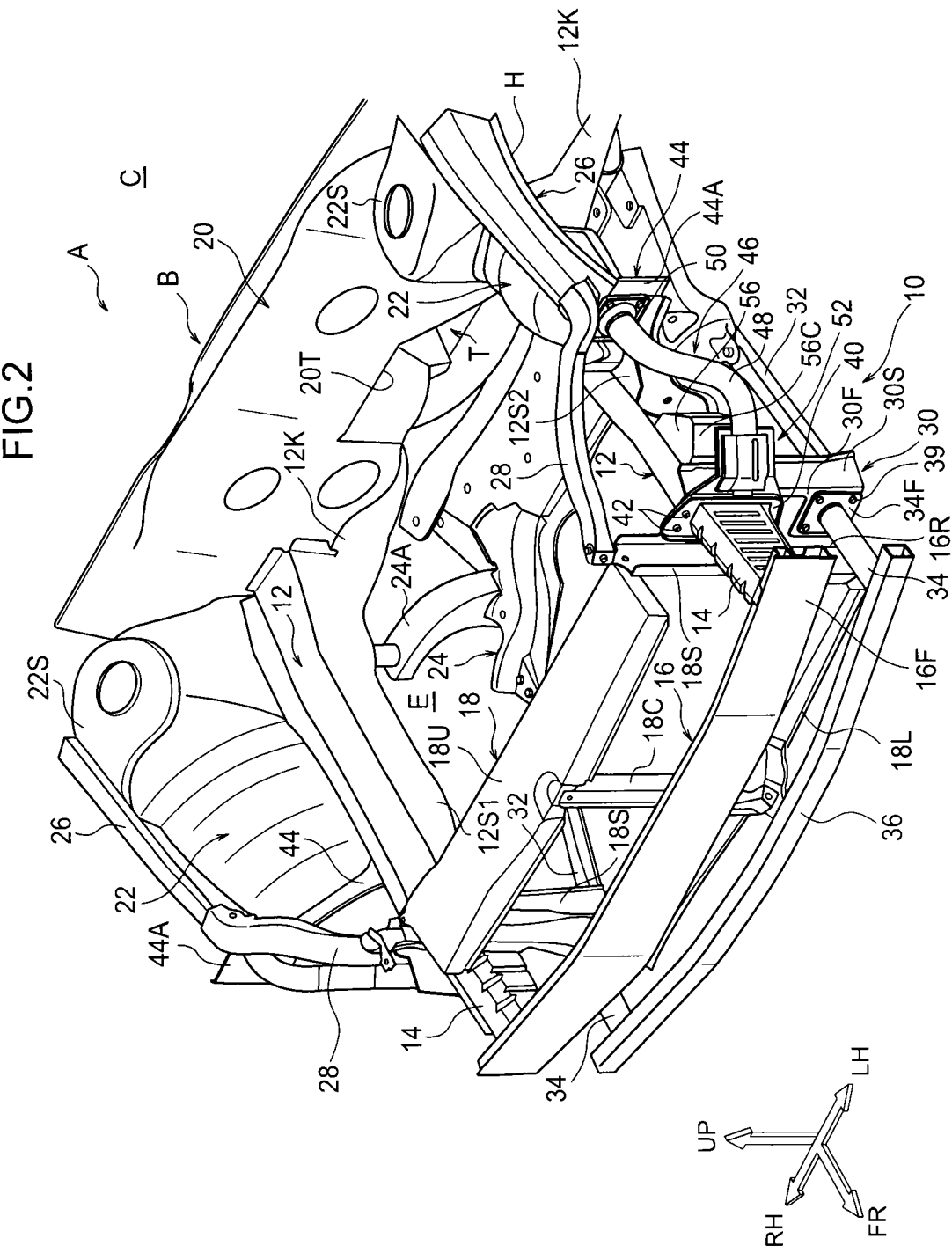
FIG. 2 is a perspective view schematically illustrating an overall configuration of a vehicle body front section structure according to the first exemplary embodiment of the present invention.

FIG. 2 is a perspective view illustrating a schematic configuration of a front section of a car A applied with the vehicle body front section structure. As illustrated in FIG. 2, a vehicle body B of the car A includes a pair of left and right front side members 12. The front side members 12 are respectively disposed with their length direction in the longitudinal direction, and are disposed side-by-side in the vehicle width direction. Each of the front side members 12 is joined through a crash box 14 to bumper reinforcement 16 that is configured with its length direction in the vehicle width direction. Namely, the bumper reinforcement 16 spans between front ends of the left and right crash boxes 14.

The bumper reinforcement 16 of the present exemplary embodiment has a B-shaped cross-section profile as taken orthogonally to its length direction. Specifically, the bumper reinforcement 16 is configured with a B-shaped cross-section profile by joining a front panel 16F to respective flanges of a rear panel 16R that is configured by a pair of upper and lower recessed portions that are open toward the front, the recessed portions being formed between three flanges, namely an upper, an intermediate, and a lower flange, so as to configure two closed cross-section portions in a row above and below each other. Note that a recessed portion that opens toward the rear is configured between the upper and lower closed cross-section portions. Although not illustrated in the drawings, beads that project out toward the rear (toward the insides of the closed cross-sections) so as to open toward the front may be formed across the vehicle width direction of the front panel 16F at portions configuring front walls of the upper and lower closed cross-sections. The bumper reinforcement 16 is configured with high rigidity and strength with respect to bending due to employing a structure such as in this example.

A radiator support 18 is attached between front portions of the left and right front side members 12. In the radiator support 18, both vehicle width direction ends of an upper member 18U and a lower member 18L that face each other from above and below are joined together by a pair of left and right side members 18S, such that the radiator support 18 is configured including a portion formed with a rectangular frame shape as viewed from the front. In the present exemplary embodiment, a center member 18C is provided to couple together vehicle width direction center portions of the upper member 18U and the lower member 18L. Note that the side members 18S of the present exemplary embodiment each include a jutting out portion that juts out toward the vehicle width direction outside, and together with a flange 52F, described later, the jutting out portion is interposed between and fastened together with a front flange 30 and a rear flange 40, described later (see FIG. 5).

A dash panel 20 that partitions an engine compartment E from a cabin C is joined to a rear end side of each of the front side members 12. More specifically, rear portions of the front side members 12 are each configured with a kick portion 12K inclined such that a rear side is positioned lower than a front side thereof. Each kick portion 12K is joined to a front face side of the dash panel 20. A rear lower end of each kick portion 12K is connected to underfloor reinforcement that is joined to the underneath of a floor panel, not illustrated in the drawings. A vehicle width direction central portion of the dash panel 20 is formed with a tunnel section 20T that is connected to a floor tunnel T.

A fender apron 22 is provided at the vehicle width direction outside of each of the front side members 12. In the present exemplary embodiment, each fender apron 22 forms a wheel house H that accommodates a front wheel, not illustrated in the drawings, in a manner allowing the front wheel to be steered, and is also integrally formed with a suspension tower 22S. Each suspension tower 22S is configured to support an upper end portion of a suspension, not illustrated in the drawings, supporting the front wheels accommodated in the wheel houses H. Moreover, a suspension member 24 that supports the suspension is attached to each front side member 12. In the present exemplary embodiment, the suspension member 24 is an I-shaped suspension member with length in the vehicle width direction, and both ends of the suspension member 24 in the vehicle width direction support a lower arm, not illustrated in the drawings, configuring the suspension, such that the lower arm is rotatable about an axis running along the vehicle longitudinal direction.

The suspension member 24 is joined to the front side members 12 at plural locations separated from each other to the front and rear. Specifically, front portions of both vehicle width direction outer ends of the suspension member 24 are joined through arm members 24A to longitudinal direction intermediate portions of the front side members 12 from below. Although not illustrated in the drawings, rear portions of both vehicle width direction outer ends of the suspension member 24 are joined, either directly or indirectly, to the rear lower end portions of the kick portions 12K of the front side members 12.

A portion at a vehicle width direction inner end and vertical direction lower end of each fender apron 22 is joined to the corresponding front side member 12. A portion at a vehicle width direction outer end and vertical direction upper end of each fender apron 22 is joined to an apron upper member 26, this being a framework member with length direction in the longitudinal direction. Each apron upper member 26 is disposed following a vehicle width direction outer end of a front upper section of the vehicle body B, and a rear end portion of each apron upper member 26 is joined to a cowl portion, not illustrated in the drawings. In other words, a rear end of the apron upper member 26 is supported by the dash panel 20 through the cowl portion. A front end side of each apron upper member 26 is coupled through an extension 28 to an upper end of the side member 18S (a vehicle width direction outer end portion of the upper member 18U) configuring the radiator support 18.

Although described in more detail later, the front flange 30 for joining to the crash box 14 is provided at a front end of each front side member 12. The front flange 30 is a member formed substantially in a hat shape opening toward the rear in plan view, and with its length running in the vertical direction. The front flange 30 projects out downward with respect to the front side member 12. A lower member 32, this being a member with length running from front to rear, couples between a lower portion of each front flange 30 and a vehicle width direction outside end portion of a front portion of the suspension member 24.

A flange 34F provided to a rear end of a pipe member 34 with length in the longitudinal direction is joined by fastening in the longitudinal direction to a front-facing face of the lower portion of each front flange 30. Each pipe member 34 is joined by fastening with fasteners 39, such as nuts and bolts as illustrated in FIG. 1, in a state in which the flange 34F formed at the rear end of the pipe member 34 is in face-to-face contact with a lower portion of a flange body 30F. Lower side bumper reinforcement 36 spans between front ends of the left and right pipe members 34.

In the configuration described above, a power unit P (see FIG. 3), this being a drive source of the car A, is installed inside the engine compartment E. The power unit P is directly or indirectly supported by locations configuring the vehicle body B, such as the left and right front side members 12 and the suspension member 24. The power unit P is disposed between the left and right front side members.

Configuration of Relevant Portions

Flange Fastening Structure

The relevant portions of the vehicle body front section structure 10 are basically configured with lateral symmetry, and so the following explanation focuses mainly on the structure on the left side. As illustrated in FIG. 1, the front flange 30 described above is joined to the front end of the front side member 12. The front flange 30 is configured including at least the forward-facing flange body 30F, a pair of side walls 30S extending from both left and right ends of the flange body 30F toward the rear, and a bottom wall 30B connecting the flange body 30F together with lower ends of the pair of side walls 30S.

Figure 3:
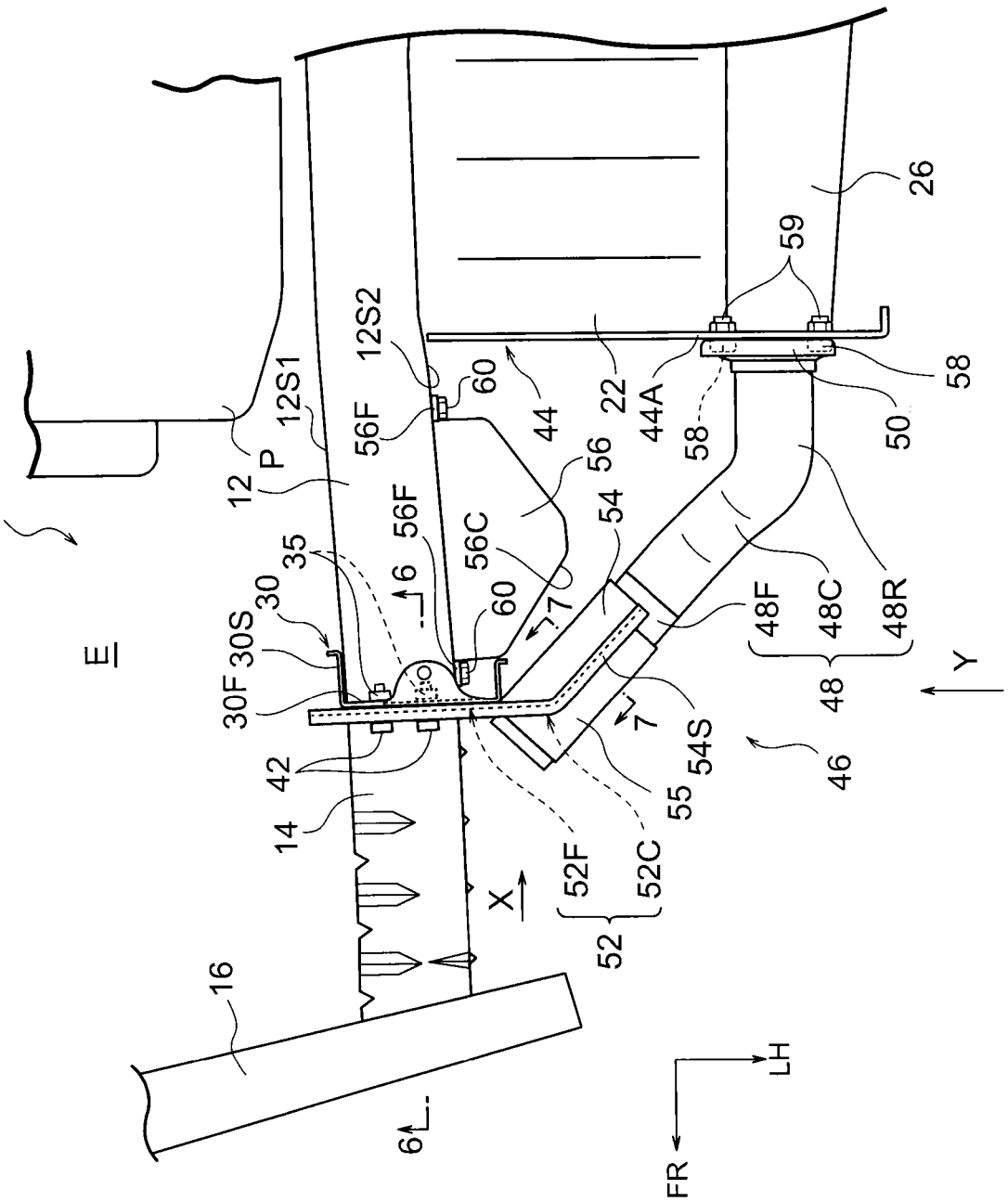
FIG. 3 is an enlarged plan view illustrating relevant portions of a vehicle body front section structure according to the first exemplary embodiment of the present invention.
Figure 5:
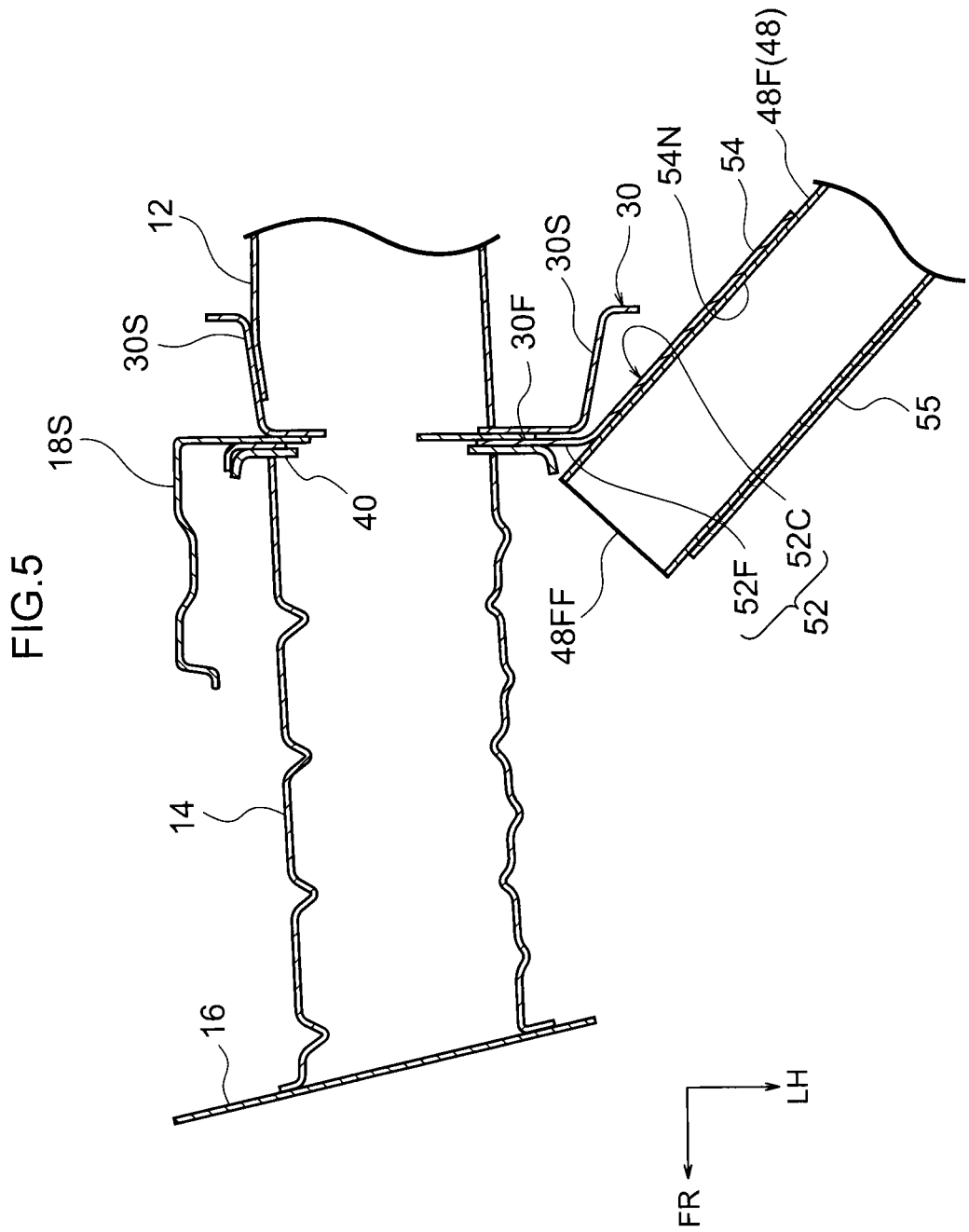
FIG. 5 is a cross-section taken along line 5-5 in FIG. 4.
Figure 6:
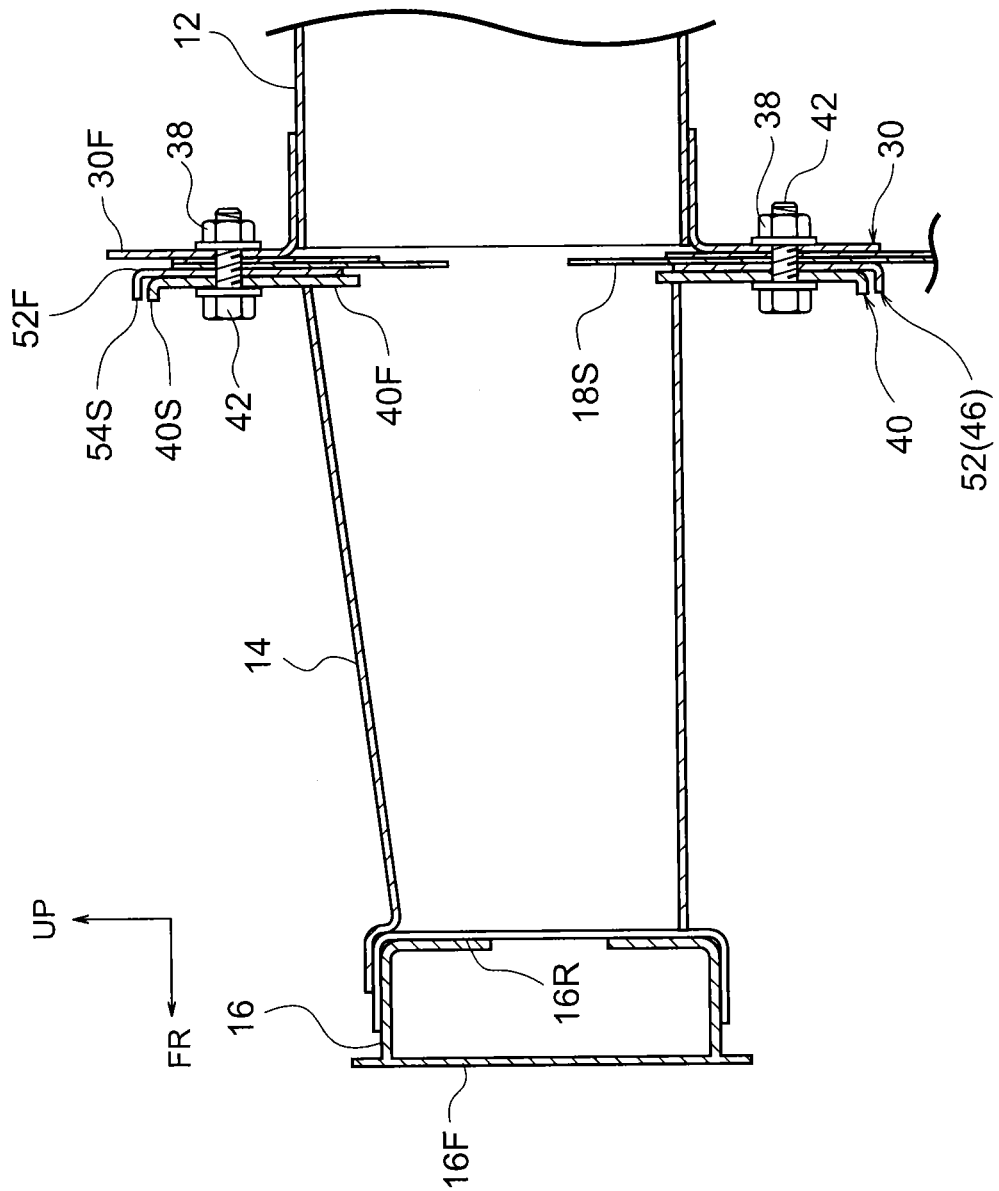
FIG. 6 is a cross-section taken along line 6-6 in FIG. 3.

As illustrated FIG. 3, FIG. 6, and so on, plural weld nuts 38 (four in the present exemplary embodiment, forming a rectangular shape with its length running from top to bottom as viewed from the front) are provided at a back face of the flange body 30F. As illustrated in FIG. 3 and FIG. 5, the side wall 30S on the vehicle width direction inside of the front flange 30 is disposed either in contact with, or extremely close to, a side face 12S1, this being a vehicle width direction inside-facing inside face of the front side member 12. The vehicle width direction inside side wall 30S corresponds to a side wall portion.

As illustrated in FIG. 1, the rear flange 40 is provided to a rear end of the crash box 14. The rear flange 40 is configured with peripheral walls 40S projecting out a short distance toward the front from peripheral edges of a flange body 40F. Although not illustrated in the drawings, bolt insertion holes are formed in the flange body 40F at positions corresponding to the weld nuts 38 of the flange body 30F.

The crash box 14 is joined to the front end of the front side member 12 by fastening the rear flange 40 to the front flange 30 by screwing bolts 42 together with the weld nuts 38. The flange 52F, serving as a joining plate of a coupling member 46, described later, is interposed between and fastened together with the rear flange 40 of the crash box 14 and the front flange 30 of the front side member 12.

The four fastening positions where the weld nuts 38 and the bolts 42 are screwed together are respectively disposed so as to be on both the upper and lower sides of a center line splitting a cross-section orthogonal to the length direction of the front side member 12 into top and bottom, and on both the left and right sides of a center line splitting the cross-section into left and right.

Apron Upper Member

A forward facing plate shaped end plate 44 is joined to a front end of the apron upper member 26. The end plate 44 extends along a front edge of the fender apron 22 from a join portion with the apron upper member 26 toward the vehicle width direction inside, and is also joined to the front edge of the fender apron 22. A vehicle width direction outer end of the end plate 44, this being the join portion with the apron upper member, configures a rectangular plate portion 44A that is substantially square shaped as viewed from the front. A location where the end plate 44 is also joined to the front edge of the fender apron 22 forms a substantially arc shape as viewed from the front, and is connected to a vehicle width direction inside and a lower side end portion of the rectangular plate portion 44A.

In the present exemplary embodiment, a structural body configured by joining together the fender apron 22, the apron upper member 26, and the end plate 44, or any one or two of these members in isolation, corresponds to a fender apron of the present invention.

Coupling Member

The vehicle body front section structure 10 includes the coupling member 46 that couples the front end of the apron upper member 26 to the front end of the front side member 12. The coupling member 46 is configured with main portions of a pipe 48, serving as a main body having a closed cross-section structure, a rear flange 50 provided to a rear end of the pipe 48, and a front side join portion 52 provided at a front end of the pipe 48.

Figure 4:
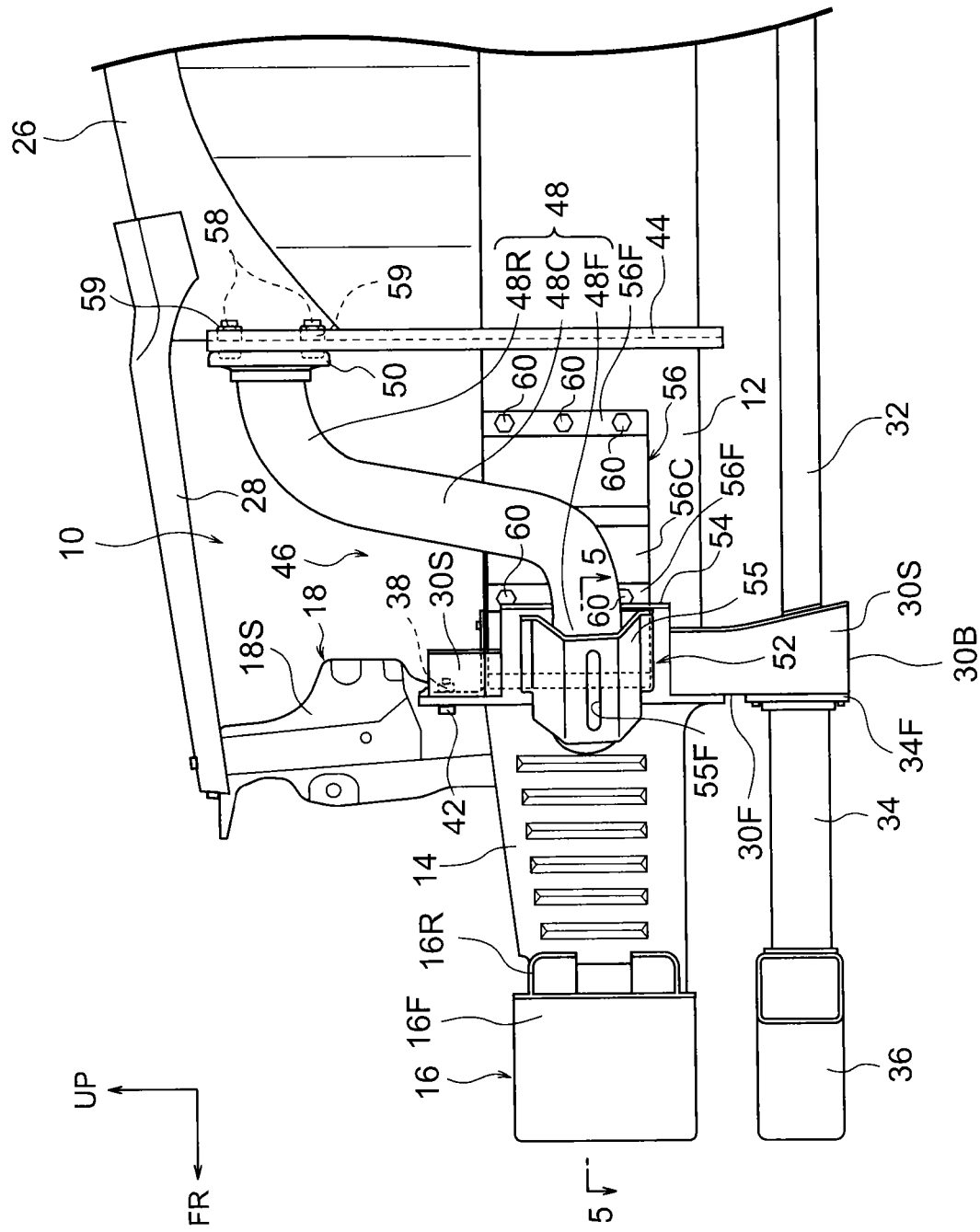
FIG. 4 is an enlarged side view illustrating relevant portions of a vehicle body front section structure according to the first exemplary embodiment of the present invention.

As illustrated in FIG. 3 and FIG. 4, the rear flange 50 is joined to the front end of the apron upper member 26 by being joined by fastening to the rectangular plate portion 44A of the end plate 44 by screwing together bolts 58 and weld nuts 59. Namely, the coupling member 46 is joined to the apron upper member 26 through the end plate 44. Accordingly, the fastening direction of the coupling member 46 to the apron upper member 26, namely to the end plate 44, is substantially aligned with the longitudinal direction.

As illustrated in FIG. 1, the pipe 48 is, for example, formed by bending a pipe member, and is curved in the manner described below so as to couple together the front end of the apron upper member 26 and the front end of the front side member 12, these being at different positions to each other in the longitudinal direction, the vertical direction, and the vehicle width direction. In the present exemplary embodiment, the pipe 48 is formed such that a rear portion 48R, an intermediate portion 48C, and a front portion 48F are connected together in this sequence from the rear.

The rear portion 48R is formed in a circular arc shape as viewed from the side, is disposed such that an upper rear end thereof is in a direction tangential to the longitudinal direction, and is joined to the rear flange 50. The front portion 48F is formed in a straight line shape angled such that a rear side of the front portion 48F is separated further to the vehicle width direction outside of the front side member 12 than a front side of the front portion 48F in plan view. A front end 48FF of the front portion 48F configures an open end opening toward the front and the vehicle width direction inside at the vehicle width direction outside of the crash box 14. The intermediate portion 48C is formed to connect the rear portion 48R and the front portion 48F together. Specifically, the intermediate portion 48C is configured by a straight portion extending downward toward the front along a direction tangential to a front lower end of the rear portion 48R, and a circular arc shaped portion smoothly connecting a front lower end of the straight portion to a rear end of the front portion 48F (so as to form boundaries thereto along respective tangential directions).

As illustrated in FIG. 3, in plan view of the pipe 48, the rear portion 48R mainly has a straight line shape running along the longitudinal direction, and the intermediate portion 48C and the front portion 48F are formed in a straight line shape angled such that the rear side is separated further to the vehicle width direction outside of the front side member 12 than the front side. In plan view, a vehicle width direction inside end portion of the front end 48FF of the front portion 48F (hidden by the flange 52F, described later, in FIG. 1) is positioned at (in the vicinity of) the vehicle width direction outside of the join portion between the front side member 12 and the crash box 14.

As illustrated in FIG. 4, in side view of the pipe 48, the front portion 48F (a portion mainly hidden by the flange 52F, described later, in FIG. 4) configures a horizontal portion running in a substantially horizontal plane (along the length direction of the front side member 12). The front side join portion 52 is joined to the substantially horizontal front portion 48F. In other words, as viewed from the side, a portion of the main body extending rearward from the front side join portion 52 along the length direction of the front side member 12 (the horizontal direction) configures the front portion 48F, and the front portion 48F corresponds to a horizontal portion of the present invention.

The front side join portion 52 is configured including the flange 52F that is fastened together with the rear flange 40 of the crash box 14 and the front flange 30 of the front side member 12, and a pipe-joined portion 52C that is joined to the front portion 48F of the pipe 48. Specifically, as illustrated in FIG. 1, and in FIG. 3 to FIG. 5, the front side join portion 52 has a two-member configuration including a main panel 54 and a reinforcement panel 55, both of which serve as plate members. The flange 52F is configured by the main panel 54, is formed in a forward-facing flat plate shape, and is formed with four bolt insertion holes (not illustrated in the drawings) through which the bolts are inserted. Peripheral walls 54S project out a short distance toward the front from peripheral edges of the main panel 54.

Figure 7:
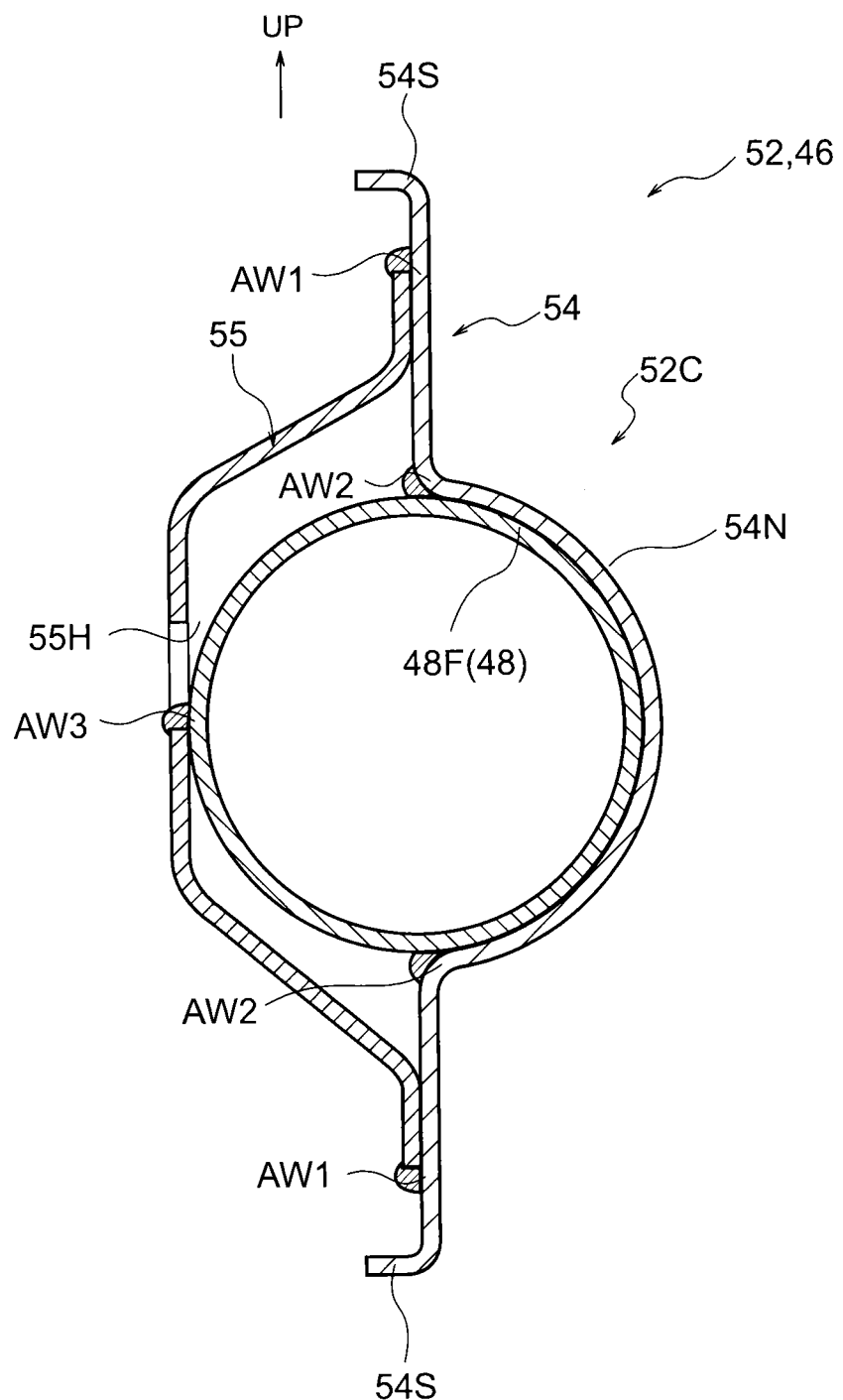
FIG. 7 is a cross-section taken along line 7-7 in FIG. 3.

A portion of the main panel 54 at the vehicle width direction outside of the portion configuring the flange 52F is angled to follow the length direction of the front portion 48F of the pipe 48, and is formed with a recess 54N that is recessed in a semicircular shape so as to cover the rear of the front portion. As illustrated in FIG. 7, the reinforcement panel 55 is formed with a hat shaped cross-section that encloses the pipe 48 that fits into the recess 54N. Accordingly, in the pipe-joined portion 52C, both the main panel 54 and the reinforcement panel 55 jut out along the vertical direction on both sides of the pipe 48.

In the pipe-joined portion 52C, the pipe 48 and the front side join portion 52 are joined together by welding at respective portions in a state in which the front portion 48F is fitted into the recess 54N and the pipe 48 is covered by the reinforcement panel 55. More specifically, the reinforcement panel 55 and the main panel 54 are joined together by performing a long weld (either continuously or intermittently; the same applies below) along the length direction of the front portion 48F (a direction orthogonal to the cross-section illustrated in FIG. 7) at arc weld portions AW1 illustrated in FIG. 7. The main panel 54 and the front portion 48F of the pipe 48 are joined together by performing a long weld along the length direction of the front portion 48F at arc weld portions AW2. The reinforcement panel 55 and the front portion 48F of the pipe 48 are also joined together by performing a long weld along the length direction of the front portion 48F at an arc weld portion AW3.

The reinforcement panel 55 is superimposed with the main panel 54 at two locations straddling the recess 54N in the vertical direction, and the arc weld portions AW1 are configured by fillet welds (superimposed joints) along upper and lower edge portions of the reinforcement panel 55. An elongated hole 55H, with its length along the length direction of the front portion 48F, is formed at an vertical direction intermediate portion of the reinforcement panel 55, and the arc weld portion AW3 is configured by a fillet weld (a superimposed joint) along a lower edge of the elongated hole 55H. The arc weld portions AW2 are formed by arc welding open ends of the recess 54N and a peripheral face of (the front portion 48F of) the pipe 48 along the length direction of the front portion 48F.

The front side join portion 52 may be understood as a configuration in which the flange 52F is a single-member configuration of the main panel 54, and the pipe-joined portion 52C is a two-member configuration of the main panel 54 and the reinforcement panel 55.

In the coupling member 46 described above, the rear flange 50 is joined to the end plate 44 by fastening from the front, and the flange 52F of the front side join portion 52 is fastened together with the rear flange 40 and the front flange 30 in an interposed state therebetween. The coupling member 46 is thereby configured to couple the front end of the apron upper member 26 and the front end of the front side member 12 together.

In other words, the coupling member 46 of the present exemplary embodiment may be understood as a framework member supported by the front side member 12 and the apron upper member 26 in a state in which the coupling member 46 juts out toward the vehicle width direction outside with respect to the front side member 12. As illustrated in FIG. 3, the coupling member 46 is also configured jutting out by a large amount to the vehicle width direction outside with respect to the bumper reinforcement 16. The coupling member 46 may accordingly be understood as being, in effect, an input location of collision load in a collision mode at the vehicle width direction outside of the front side member 12.

In the present exemplary embodiment, as described above, a portion on the front end side of the coupling member 46, namely the front portion 48F and the intermediate portion 48C of the pipe 48, and the pipe-joined portion 52C of the front side join portion 52, are angled such that the rear side is separated further from the front side member 12 than the front side in plan view. As illustrated in FIG. 3, the front end 48FF of the pipe 48 configuring the coupling member 46 projects out further to the front than the front end of the front side member 12.

Spacer

As illustrated in FIG. 1 and FIG. 3, a spacer 56 is provided to a portion of a vehicle width direction outward-facing side face 12S2 of the front side member 12 that is at the vehicle width direction inside of the coupling member 46. In other words, the spacer 56 is disposed at a portion positioned between the front side member 12 and the coupling member 46 in plan view. Moreover, as illustrated in FIG. 4, viewed from the side, the spacer 56 is disposed overlapping in the vertical direction with the front side member 12 and a portion on the front end side of the coupling member 46.

More specifically, the spacer 56 overlaps with the front portion 48F of the pipe 48 configuring the coupling member 46 in the vehicle width direction and the vertical direction as viewed from the front (as viewed along arrow X in FIG. 3), and overlaps with the front portion 48F of the pipe 48 configuring the coupling member 46 in the longitudinal direction and the vertical direction as viewed from the side (as viewed along arrow Y in FIG. 3, see also FIG. 4). Namely, the spacer 56 is disposed facing the front portion 48F of the coupling member 46. The spacer 56 may also be understood as being disposed facing the pipe-joined portion 52C that serves as an opposing face portion of the front side join portion 52 of the coupling member 46.

When the coupling member 46 receives load toward the rear and deforms, (a portion of the front side join portion 52 that fits together with) the front portion 48F of the pipe 48 configuring the coupling member 46 is configured to impinge on the spacer 56. A portion of the spacer 56 on which the thus deformed coupling member 46 impinges configures an angled face 56C that is angled so as to face toward the vehicle width direction outside and the front in plan view.

The spacer 56 is joined to a portion of the front side member 12 positioned slightly in front of the power unit P, and projects out from the side face 12S2 of the front side member 12 toward the vehicle width direction outside at this portion. In the present exemplary embodiment, as illustrated in FIG. 3 and FIG. 4, the joining structure of the spacer 56 to the front side member 12 employs fastening with fasteners including bolts 60 at flanges 56F jutting out to the front and rear of the spacer 56.

The spacer 56 is configured to function as a load transmission member that transmits load from the coupling member 46 to the front side member 12 when the coupling member 46 impinges on the spacer 56 as described above. This load transmission promotes folding of the front side member 12 in the vicinity of the power unit P, as will be explained later under Operation of the present exemplary embodiment.

The spacer 56 may be configured employing a lightweight (low density) material such as aluminum (or an alloy thereof) or resin, as long as it functions as a load transmission member as described above.

Operation

Explanation follows regarding operation of the present exemplary embodiment.

Operation in a Small Overlap Collision

Explanation follows with reference to FIG. 8, regarding operation of the car A applied with the vehicle body front section structure 10 configured as described above in the event of a small overlap collision, this being a collision mode in which a colliding body (barrier Br) collides at the vehicle width direction outside of the front side member 12. The illustrated example shows a case in which the barrier Br has collided at the vehicle width direction outside of the front side member 12 on the left side. Note that the bumper reinforcement and the like are not illustrated in FIG. 8B to FIG. 8E following the collision.

Figure 8A:
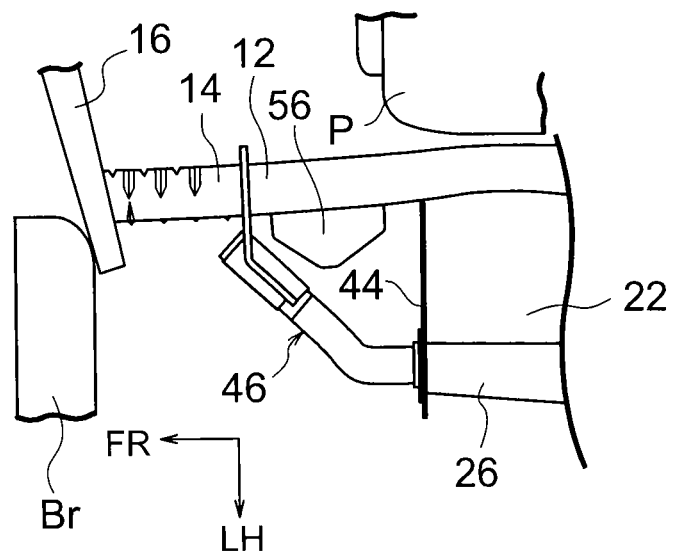
FIG. 8A is a plan view schematically illustrating operation during an initial stage of a small overlap collision to a vehicle body front section structure according to the first exemplary embodiment of the present invention.
Figure 8B:
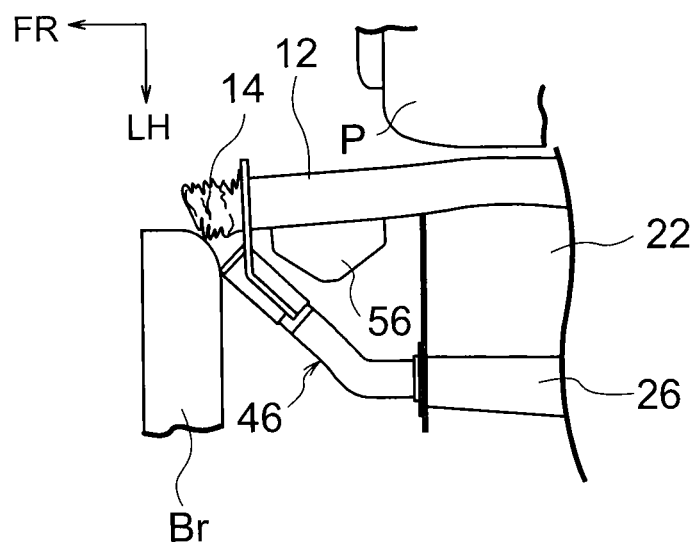
FIG. 8B is a plan view schematically illustrating a compressed state of a crash box during a small overlap collision to a vehicle body front section structure according to the first exemplary embodiment of the present invention.

In an initial stage of the small overlap collision described above, as illustrated in FIG. 8A, rearward load is input from the barrier Br to a portion of the bumper reinforcement 16 at the vehicle width direction outside of the front side member 12. When the high strength bumper reinforcement 16 with a B-shaped cross-section transmits collision load to the crash box 14, the crash box 14 is compressed in the longitudinal direction, as illustrated in FIG. 8B. Energy is accordingly absorbed in the initial stage of the collision.

Figure 8C:
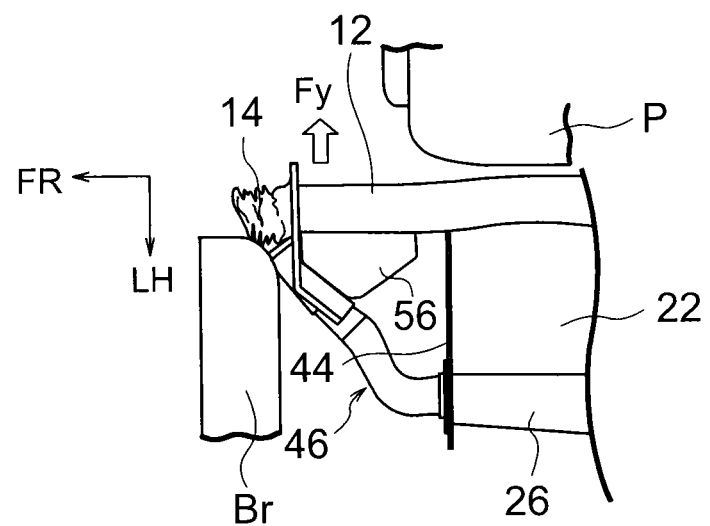
FIG. 8C is a plan view schematically illustrating a state in which a barrier impinges on a coupling member during a small overlap collision to a vehicle body front section structure according to the first exemplary embodiment of the present invention.

Next, when the barrier Br reaches a location impinging on the coupling member 46, as illustrated in FIG. 8C, a load Fy toward the vehicle width direction inside is generated in the front portion 48F, where the pipe 48 of the coupling member 46 is angled in plan view. The load Fy acts as a force in a direction to move the car A and the barrier Br apart in the vehicle width direction. Namely, the car A and the barrier Br are displaced in the vehicle width direction due to the barrier Br impinging on the coupling member 46, promoting the car A and the barrier Br to slide past one another. The barrier Br is thereby suppressed from intruding into the car A.

Figure 8D:
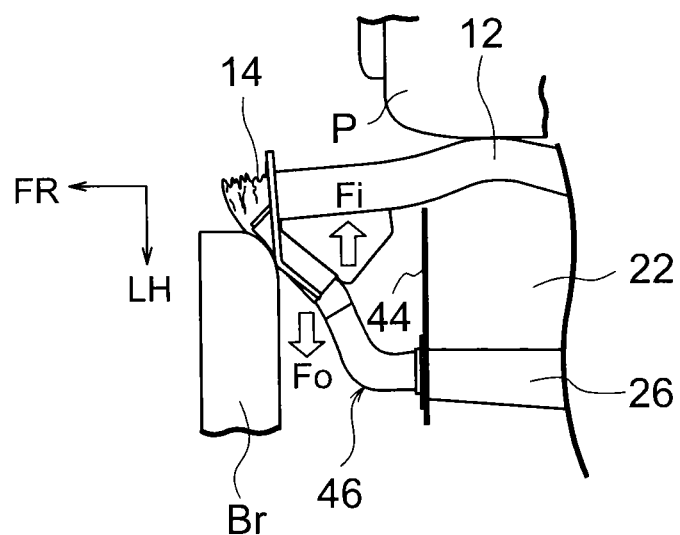
FIG. 8D is a plan view schematically illustrating a state in which load from a coupling member acts on a front side member during a small overlap collision to a vehicle body front section structure according to the first exemplary embodiment of the present invention.
Figure 8E:
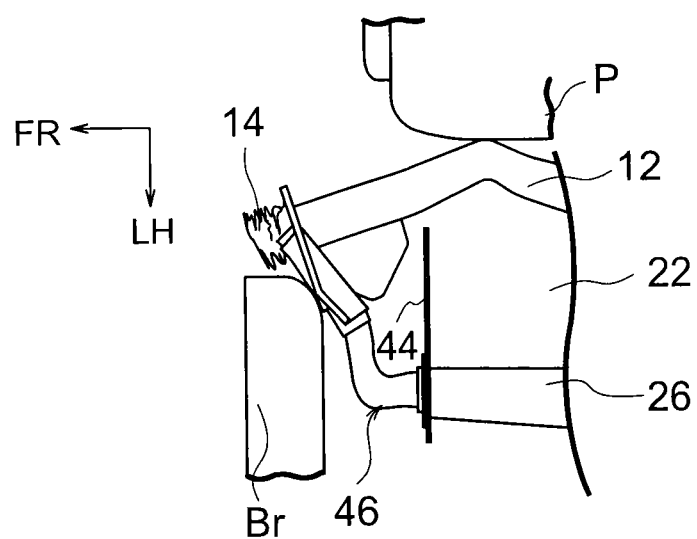
FIG. 8E is a plan view schematically illustrating a state in which a front side member is folded due to load from a coupling member during a small overlap collision to a vehicle body front section structure according to the first exemplary embodiment of the present invention.

When the barrier Br pushes the coupling member 46 toward the rear, the front end of the front side member 12 is pulled toward the vehicle width direction outside (the force Fo in FIG. 8D) by rearward deformation or displacement of the coupling member 46. As illustrated in FIG. 8D, when the coupling member 46 undergoes further deformation due to the load from the barrier Br and impinges on the spacer 56, the spacer 56 pushes the front side member 12 toward the vehicle width direction inside (the force Fi in FIG. 8D). Accordingly, as illustrated in FIG. 8E, folding of the front side member 12 toward the vehicle width direction inside occurs at a portion positioned at the vehicle width direction outside of the power unit P.

The front side member 12 pushes the power unit P toward the vehicle width direction inside due to this folding. Lateral force (force due to inertia) input to the power unit P, this being (one) section where mass is concentrated in the car A, moves the car A itself toward a collision opposite side (away from the barrier Br in the vehicle width direction). The car A and the barrier Br are thus further promoted to slide past one another, and localized deformation of a collision side end section of the vehicle body B is prevented or effectively suppressed.

Operation of the Coupling Member

A portion on the front end side of the coupling member 46, namely the front portion 48F and the intermediate portion 48C of the pipe 48, and the pipe-joined portion 52C of the front side join portion 52, is angled such that a rear side is separated further from the front side member 12 than a front side in plan view. When the barrier Br (another car or the like) collides with this angled portion, the angled portion converts a portion of the collision load into the load Fy toward the collision opposite side. The coupling member 46 accordingly promotes displacement in the vehicle width direction with respect to the barrier Br, namely promotes sliding past the barrier Br described above.

The portion on the front end side of the coupling member 46 is angled as described above, such that the coupling route between the front side member 12 and the end plate 44 is shorter than in an L-shaped coupling member with a portion jutting out along the vehicle width direction and an extension portion extending from the jutting out portion toward the rear in plan view. Under rearward deformation or displacement accompanying a small overlap collision, the coupling member 46 accordingly acts to pull the front end of the front side member 12 toward the vehicle width direction outside with less play (free movement distance) than the coupling member of the above comparative example. The coupling member 46 accordingly works together with the spacer 56 to greatly promote folding of the front side member 12.

The front flange 30 that is joined to the front side join portion 52 of the coupling member 46 includes the side walls 30S. The side walls 30S function to push the front end of the front side member 12 in the vehicle width direction when the front end of the front side member 12 is pulled toward the vehicle width direction outside due to the barrier Br pushing the coupling member 46 toward the rear. Accordingly, when the front end of the front side member 12 is being pulled toward the vehicle width direction outside, there is no reliance on shear of the bolts 42 alone, as there would be in a comparative example not including the side walls 30S. Accordingly, in the vehicle body front section structure 10, force to pull the front end of the front side member 12 toward the vehicle width direction outside can efficiently be caused to act in a small overlap collision.

Moreover, the weld nuts 38 and the bolts 42 that fasten the flange 52F of the coupling member together with the front flange 30 of the front side member 12 and the like include those positioned further to the vehicle width direction inside than a center line dividing the front side member 12 into left and right. Accordingly, in a small overlap collision, the (entire cross-section of the) entire front end of the front side member 12 is pulled toward the vehicle width direction outside, in contrast to in a configuration in which the flange 52F is only fastened together with the front flange 30 at the vehicle width direction outside of the center line. Moreover, in the coupling member 46 described above, the flange 52F is fastened together with the front flange 30 on both vehicle width direction sides. A concentration of load (stress) at a specific join location out of plural join portions that are fastened together can accordingly be better suppressed than in a configuration in which the flange 52F is only fastened together with the front flange 30 on one side of the center line.

In the vehicle body front section structure 10, the front end of the front side member 12 is efficiently pulled toward the vehicle width direction outside in a small overlap collision, contributing to folding of the front side member 12 at an appropriate location and an appropriate timing. Moreover, the front end 48FF of the pipe 48 configuring the coupling member 46 projects out further to the front than the front end of the front side member 12. Accordingly, the coupling member 46 is able to start pulling the front end of the front side member 12 toward the vehicle width direction outside after the crash box 14 has been compressed, and before the front side member 12 is compressed by the collision load. The front side member 12 can accordingly be made to fold stably toward the vehicle width direction inside (the folding direction of the front side member 12 is stabilized).

In the coupling member 46 configuring the vehicle body front section structure 10, the front side join portion 52 that is joined to the pipe 48 has the two-member configuration of the main panel 54 and the reinforcement panel 55. This enables more arc welding portions with the pipe 48 than in a comparative example employing a front flange configured by a single member. This thereby enables the weld between the pipe 48 and the front side join portion 52 to be prevented or thoroughly suppressed from coming apart in a small overlap collision, and enables the coupling member 46 to efficiently pull the front end of the front side member 12 toward the vehicle width direction outside.

Moreover, with the coupling member 46 in a comparative example with through holes for joining the coupling member formed in the front side member, if collision design is performed for a coupling member-attached state, there could be a concern that the through holes would be detrimental to collision performance in configurations in which a coupling member is not actually provided. Namely, there is a concern of variation in frontal collision performance between cases in which a coupling member is joined to the through holes, and cases in which a coupling member is not joined to the through holes. In the comparative example, in which the front side member is formed with through holes for the above purpose, it is accordingly difficult to develop common structures for vehicles not provided with a coupling member.

However, in the coupling member 46, the flange 52F of the front side join portion 52 is joined to the front end of the front side member 12 in a state interposed between the front flange 30 of the front side member 12 and the rear flange 40 of the crash box 14. This thereby enables the coupling member 46 to be provided to counter small overlap collisions, while preventing or suppressing any detriment to energy absorption characteristics during a collision (collision performance in frontal collisions) due to the front side member 12 and the like in the vehicle body front section structure 10.

Accordingly, the vehicle body front section structure 10 enables deformation of the vehicle body in a small overlap collision to be suppressed using the coupling member 46 that couples together the front side member 12 and the end plate 44, while preventing or suppressing any detriment to collision performance due to the front side member 12.

The vehicle body front section structure 10 enables the front side member 12 and the crash box 14 to be made common to vehicles in which the coupling member 46 is not provided (such as vehicles that have a different structure for countering small overlap collisions), while suppressing any detriment to collision performance in frontal collisions. Namely, a configuration in which the coupling member 46 is provided to suppress deformation of the vehicle body in a small overlap collision can be made common to a vehicle body structure of a vehicle not provided with the coupling member 46.

In particular, the rear flange 50 on the rear end side of the coupling member 46 is fastened to the apron upper member 26 using the bolts 58 and the weld nuts 59, and the front side join portion 52 on the front end side is fastened together with the front flanges 30, 40 using the bolts 42 and the weld nuts 38. This thereby facilitates achieving a structure common to vehicles not provided with the coupling member 46, or provided with structures other than the coupling member 46, compared to a comparative example in which, for example, one or both of the front and rear ends of a coupling member are joined to the vehicle body B by welding or the like.

The coupling member 46 is joined to the end plate 44 by fastening along the longitudinal direction using the bolts 58 and the weld nuts 59. In a comparative example in which, for example, a coupling member is fastened using bolts or the like that penetrate in the vehicle width direction through a wall portion of the apron upper member 26 with its length in the longitudinal direction, collision load is borne by the shear of the bolts. In contrast, since the fastening direction to the end plate 44 is the longitudinal direction, the collision load can be borne as axial force by the coupling member 46 (the rear portion 48R of the pipe 48). The coupling member 46 can accordingly efficiently receive load from the barrier Bumper reinforcement, without relying on the shear strength of the bolts 58.

Spacer Operation

Moreover, the spacer 56 is provided between the front side member 12 and the coupling member 46, and overlaps with the front side member 12 and the coupling member 46 in the vertical direction. Accordingly, when the coupling member 46 that has been deformed or displaced toward the rear due to collision load in a small overlap collision impinges on the spacer 56, the spacer 56 pushes the front side member 12 toward the vehicle width direction inside as described above. This operation, together with the operation of the coupling member 46 to pull the front end of the front side member 12 toward the vehicle width direction outside, promotes folding of the front side member 12 at the side of the power unit, and promotes vehicle width direction displacement between the car A and the barrier Br.

In particular, the spacer 56 is provided at the vehicle width direction outside facing side face 12S2 of the front side member 12. Accordingly, a specific location of the front side member 12 (the location where the spacer 56 is installed) is pushed toward the vehicle width direction inside by the spacer 56 in a small overlap collision. This thereby enables the front side member 12 to be folded at an appropriate location in a small overlap collision.

The front portion 48F of the pipe 48 of the coupling member 46 extends substantially horizontally from the front side join portion 52 toward the rear as viewed from the side. The front portion 48F is accordingly suppressed from being displaced or deformed in the vertical direction by rearward load from the barrier Br, and is displaced or deformed along a substantially horizontal plane. Load from the front portion 48F is transmitted by the spacer 56 as force to push the front side member 12 toward the vehicle width direction inside. Component force in the vertical direction can accordingly be suppressed when transmitting this load, thereby improving load transmission efficiency from the coupling member 46, through the spacer 56, and into the front side member 12 compared to a configuration in which load is transmitted to the spacer from a coupling member that is at an incline as viewed from the side. Folding of the front side member 12 is accordingly promoted, and moreover, load can be efficiently transmitted to the power unit P after the front side member 12 has folded, thus promoting vehicle width direction movement of the car A away from the barrier Br.

The pipe-joined portion 52C of the front side join portion 52 of the coupling member 46 juts out in the vertical direction with respect to the front portion 48F, and faces the spacer 56. Load from the barrier Br is accordingly also transmitted through the spacer 56 to the front side member 12 through the pipe-joined portion 52C. This thereby enables collision load to be efficiently transmitted to the front side member 12 through the pipe-joined portion 52C and the spacer 56 over a wider vertical range than in a configuration in which the join portion does not jut out to the top and bottom of the front portion 48F of the pipe 48.

Second Exemplary Embodiment

Explanation follows regarding a vehicle body front section structure 65 according to a second exemplary embodiment of the present invention, with reference to FIG. 9 to FIG. 12. Note that components and portions that are basically the same as those of the first exemplary embodiment are allocated the same reference numerals as in the first exemplary embodiment, and explanation and illustration thereof is omitted as appropriate.

Figure 10:
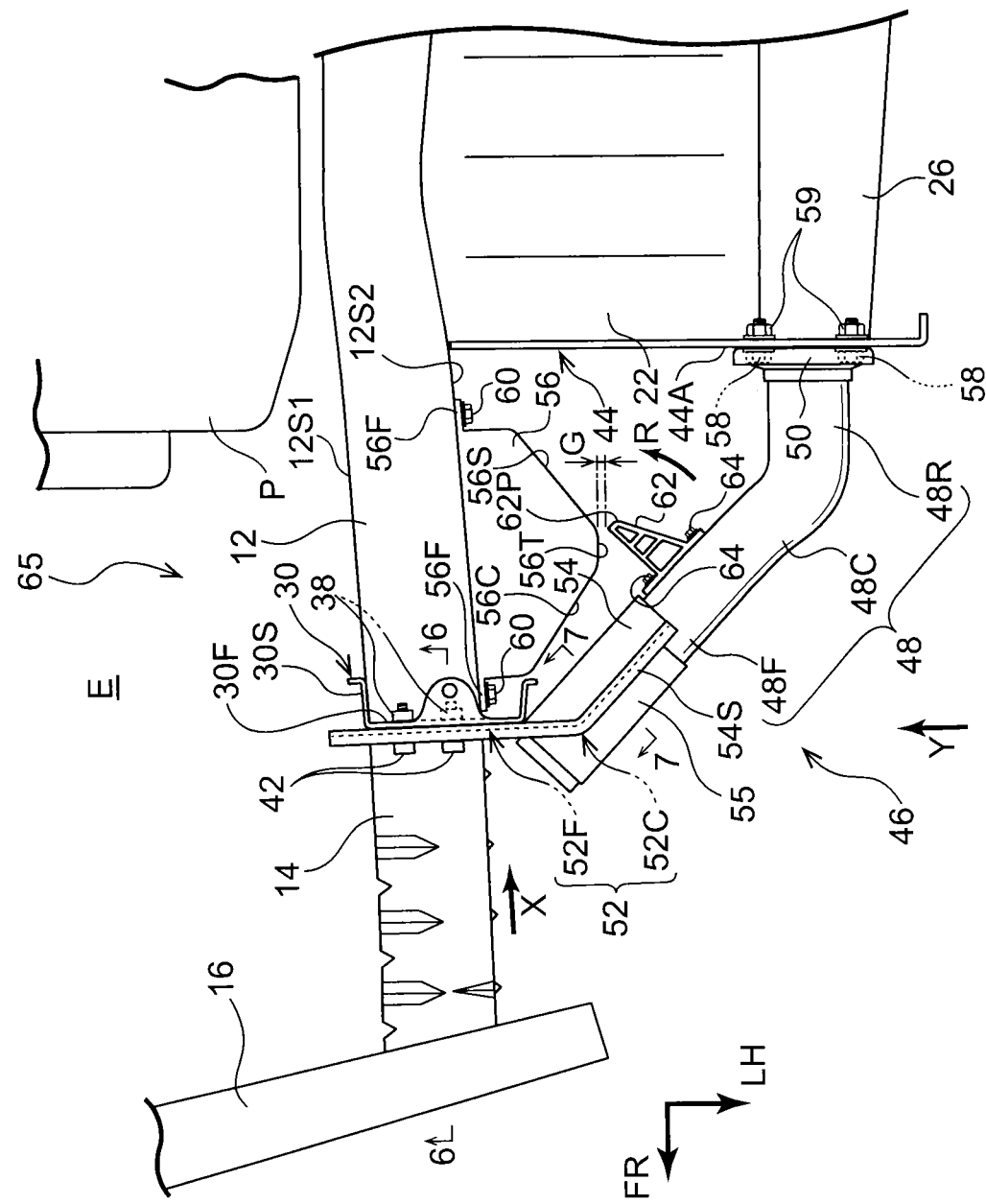
FIG. 10 is an enlarged plan view illustrating relevant portions of a vehicle body front section structure according to the second exemplary embodiment of the present invention.
Figure 11:
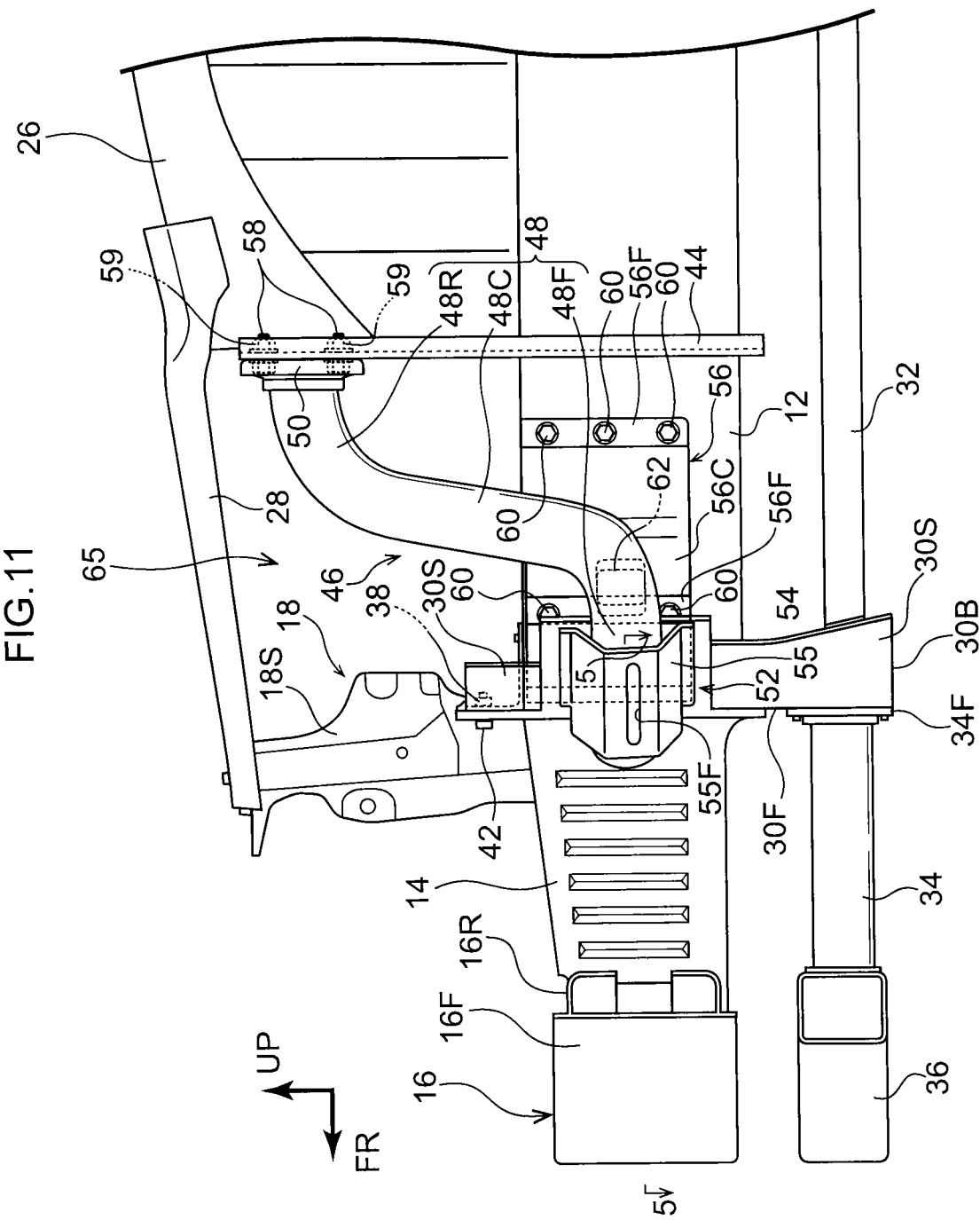
FIG. 11 is an enlarged side view illustrating relevant portions of a vehicle body front section structure according to the second exemplary embodiment of the present invention.

FIG. 9 is a perspective view of the vehicle body front section structure 65, corresponding to FIG. 1. FIG. 10 is a plan view of the vehicle body front section structure 65, corresponding to FIG. 3. FIG. 11 is a side view of the vehicle body front section structure 65, corresponding to FIG. 4. As illustrated in these drawings, the vehicle body front section structure 65 differs from the vehicle body front section structure 10 in the provision of a support member 62.

Note that as illustrated in FIG. 10, in the present exemplary embodiment an apex portion 56T where the spacer 56 juts out furthest in the vehicle width direction is positioned substantially at the longitudinal direction center of the spacer 56. The spacer 56 is formed with a supported face 56S, this being an angled face angled so as to face toward the vehicle width direction outside and the rear in plan view, at the rear of the apex portion 56T.

Support Member

As illustrated in FIG. 10, the support member 62 is provided projecting out toward the spacer 56 side at the front portion 48F (which may encompass a portion of the intermediate portion 48C positioned in the vicinity of a boundary therewith), this being the angled portion of the pipe 48 configuring the coupling member 46. The support member 62 has a narrow width at a leading end 62P side positioned further to the spacer 56 side than a base end 62B on the side joined to the pipe 48. The support member 62 has a wedge shaped outer profile in plan view. A structure for joining the support member 62 to the pipe 48 employs fastening using fastenings including bolts 64.

The support member 62 projects out from the pipe 48 to the spacer 56 side such that the leading end 62P faces the supported face 56S side of the spacer 56, and corresponds to a projection portion of the present invention. Together with the coupling member 46, the support member 62 is disposed in a state separated from the spacer 56. Namely, the support member 62 is not restrained by the spacer 56. In the present exemplary embodiment, the leading end 62P of the support member 62 is positioned further to the vehicle width direction outside than the apex portion 56T of the spacer 56. Namely, the entire support member 62 is disposed offset to the vehicle width direction outside with respect to the spacer 56 across a gap G, illustrated in FIG. 10.

When the pipe 48 of the coupling member 46 rotates (is deformed or displaced) about its front end (a vehicle width direction outer end of the flange 52F) in the direction of arrow R in FIG. 10 in plan view, the support member 62 described above swings around toward the rear of the supported face 56S of the spacer 56. The support member 62 contacts or becomes extremely close to the supported face 56S in this swung around state.

Operation

Next, explanation follows regarding operation of the second exemplary embodiment.

Note that operation of the coupling member and operation of the spacer in a small overlap collision are similar to the operation of the coupling member and the operation of the spacer in a small overlap collision in the vehicle body front section structure of the first exemplary embodiment, and so explanation thereof is omitted.

Support Member Operation

Figure 12A:
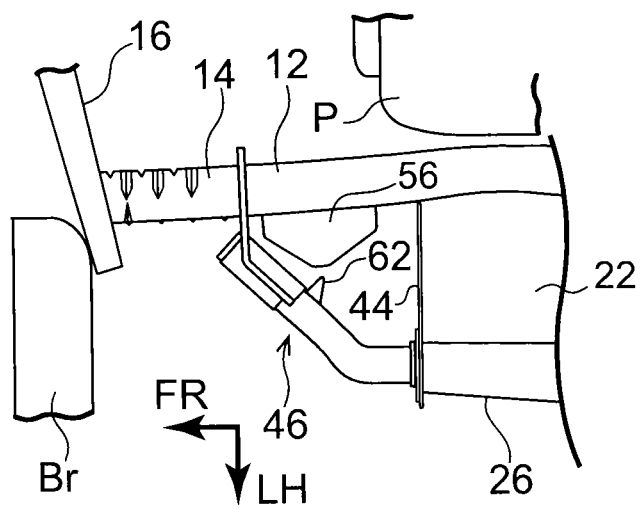
FIG. 12A is a plan view schematically illustrating operation during an initial stage of a small overlap collision to a vehicle body front section structure according to the second exemplary embodiment of the present invention.
Figure 12B:
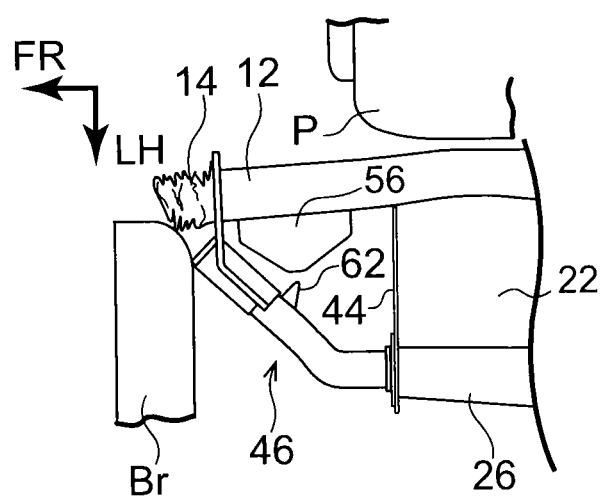
FIG. 12B is a plan view schematically illustrating a compressed state of a crash box during a small overlap collision to a vehicle body front section structure according to the second exemplary embodiment of the present invention.
Figure 12C:
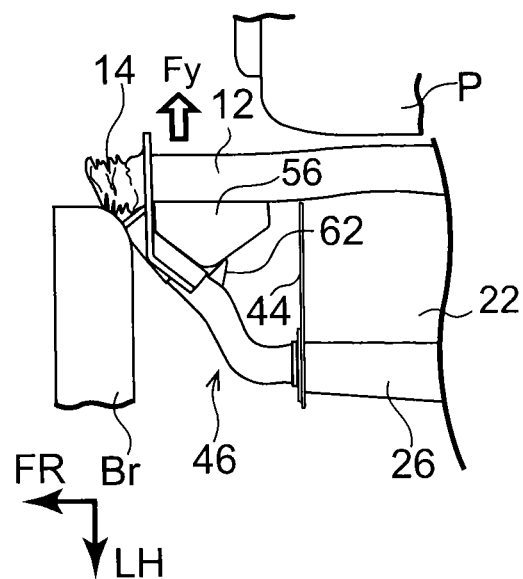
FIG. 12C is a plan view schematically illustrating a state in which a barrier impinges on a coupling member during a small overlap collision to a vehicle body front section structure according to the second exemplary embodiment of the present invention.
Figure 12D:
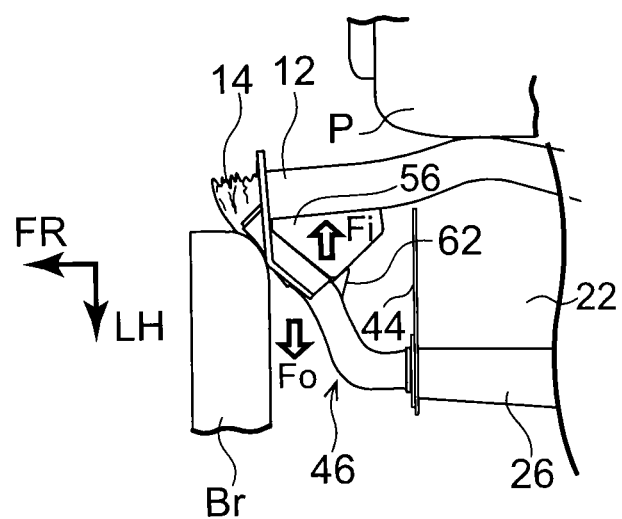
FIG. 12D is a plan view schematically illustrating a state in which load from a coupling member acts on a front side member during a small overlap collision to a vehicle body front section structure according to the second exemplary embodiment of the present invention.

As illustrated in FIG. 12A to FIG. 12C, when the coupling member 46 deforms until it impinges on the spacer 56, the support member 62 provided to the coupling member 46 swings around to the rear of the supported face 56S of the spacer 56 while undergoing displacement toward the rear together with the coupling member 46. Namely, the support member 62 swings around to the vicinity of the rear side of the spacer 56 accompanying rotation about the front end side of the coupling member 46. Accordingly, as illustrated in FIG. 12D, the spacer 56 transmits load from the coupling member 46 to the front side member 12 while the supported face 56S is supported from the rear by the support member 62.

Note that the spacer 56 is subjected to shear load between the spacer 56 and the front side member 12 (the side face 12S2) due to the load from the coupling member 46. In the vehicle body front section structure 65, this shear load is supported by the support member 62, such that positional displacement of the spacer 56 with respect to the front side member 12 in the longitudinal direction, and decoupling of the spacer 56 from the front side member 12, is prevented or effectively suppressed. The support member 62 provided to the coupling member 46 is displaced toward the rear together with the coupling member 46 (spacer 56). Accordingly, positional displacement and decoupling of the spacer 56 with respect to the front side member 12 are prevented or effectively suppressed due to obstructing movement of the spacer 56 toward the rear.

Figure 12E:
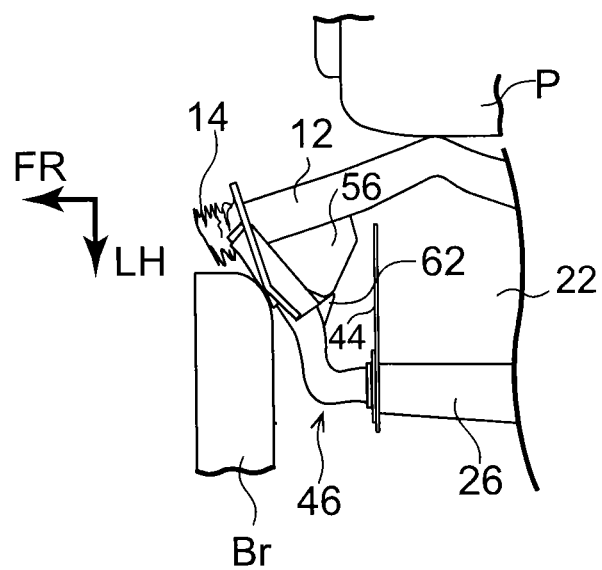
FIG. 12E is a plan view schematically illustrating a state in which a front side member is folded due to load from a coupling member during a small overlap collision to a vehicle body front section structure according to the second exemplary embodiment of the present invention.

In a small overlap collision, load transmission to the front side member 12 is accordingly promoted in comparison to a comparative example in which the support member 62 is not provided. Namely, the operation of the support member 62 to support the spacer 56 enables the spacer 56 to fold the front side member 12 at an appropriate location. As illustrated in FIG. 12E, after folding of the front side member 12, a joined state to the front side member 12 is maintained at an appropriate location. Load toward the collision opposite side can accordingly be efficiently transmitted to the power unit P through the spacer 56 and the front side member 12.

In the vehicle body front section structure 65, the support member 62 and the coupling member 46 are disposed at a separation to the spacer 56. Accordingly, the movement of the spacer 56 is prevented or effectively suppressed from being restrained or impeded by the support member 62 and the coupling member 46 in collision modes other than a small overlap collision, such as a full overlap frontal collision. Namely, in a collision mode other than a small overlap collision, restraint of or interference with the behavior of the front side member 12 by the support member 62 and the coupling member 46 is prevented or effectively suppressed due to the spacer 56.

The support member 62 is accordingly provided so as not to be detrimental to collision performance in collision modes other than a small overlap collision, and also enables improved collision performance in a small overlap collision. In particular, the entire support member 62 is offset to the vehicle width direction outside with respect to the spacer 56. The support member 62 therefore does not impinge during simple rearward movement of the spacer 56, enabling any detriment to collision performance to be kept small in collision modes other than a small overlap collision.

Third Exemplary Embodiment

Figure 13:
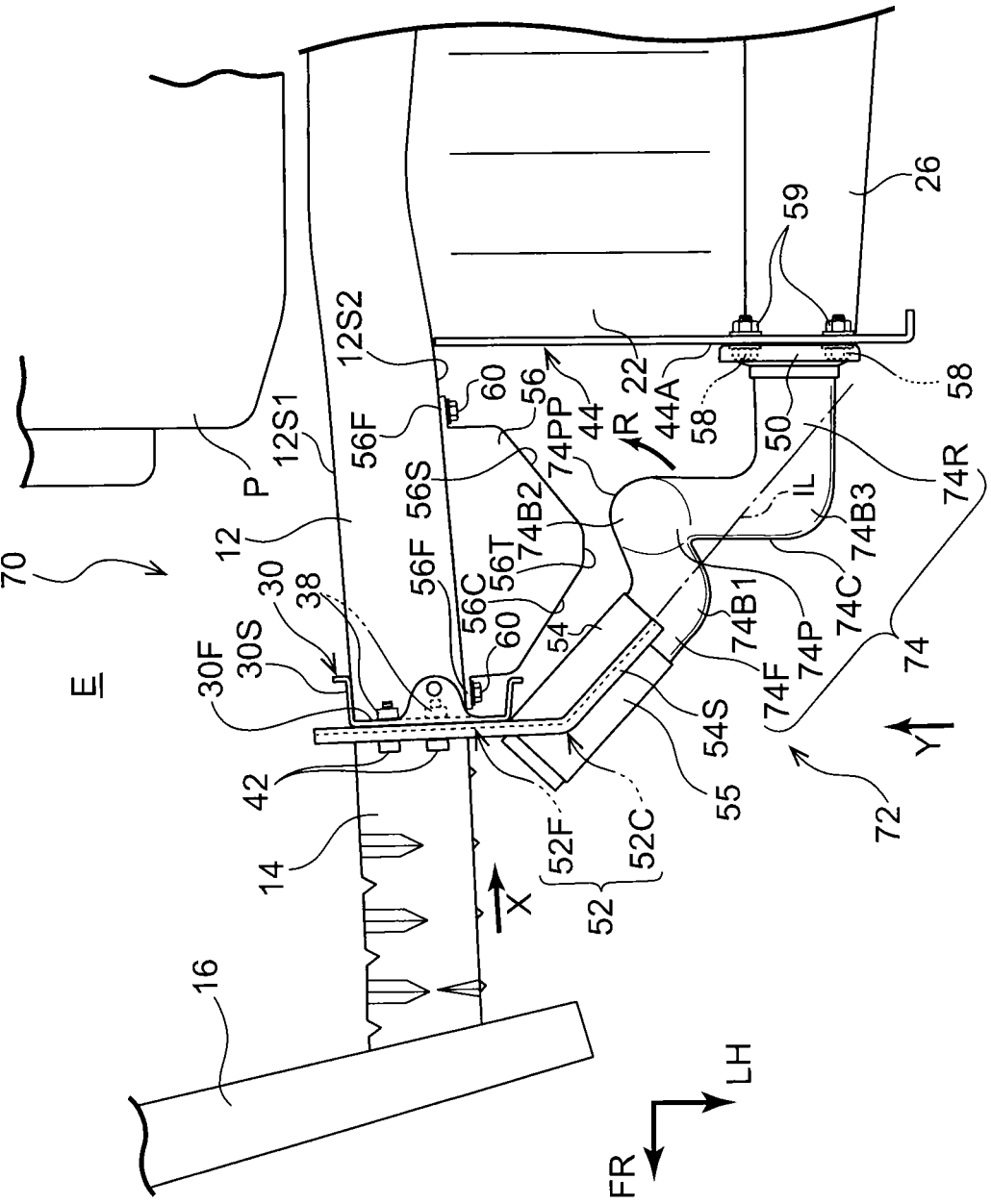
FIG. 13 is an enlarged plan view illustrating relevant portions of a vehicle body front section structure according to a third exemplary embodiment of the present invention.
Figure 14:
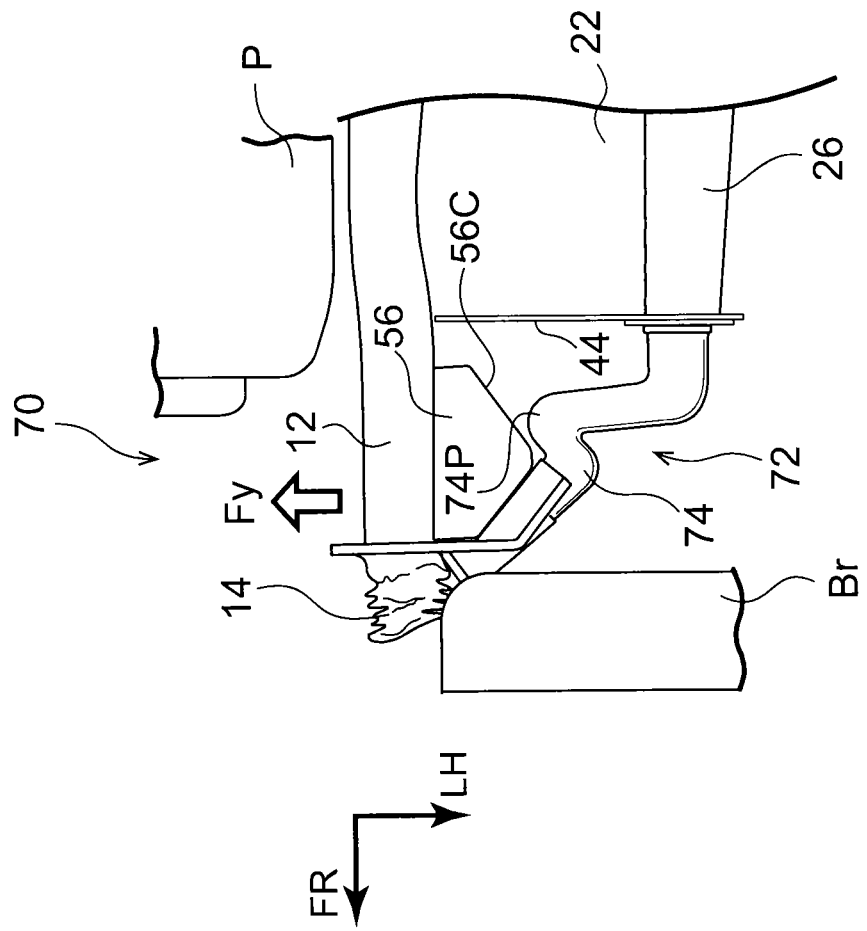
FIG. 14 is a plan view schematically illustrating a state in which a projection portion supports a spacer during a small overlap collision to a vehicle body front section structure according to the third exemplary embodiment of the present invention.

Explanation follows regarding a vehicle body front section structure 70 of a third exemplary embodiment of the present invention, with reference to FIG. 13 and FIG. 14. Note that components and portions that are basically the same as those of the first or the second exemplary embodiment are allocated the same reference numerals as in the first or the second exemplary embodiment, and explanation and illustration thereof is omitted as appropriate.

FIG. 13 is a plan view corresponding to FIG. 10, and illustrates relevant portions of the vehicle body front section structure 70. As illustrated in FIG. 13, a coupling member 72 configuring the vehicle body front section structure 70 is configured with main portions of a pipe 74 serving as a main body, the front side join portion 52, and the rear flange 50. The pipe 74 differs from the pipe 48 in the point that it is formed with a projection portion 74P, serving as a support member, by bending the pipe member from which it is made. Specific explanation follows thereof.

The pipe 74 includes a rear portion 74R formed similarly to the rear portion 48R, and a front portion 74F that is configured similarly to the front portion 48F at least at a location joined to the pipe-joined portion 52C of the front side join portion 52. The pipe 74 further includes an intermediate portion 74C connecting between the rear portion 74R and the front portion 74F. The projection portion 74P is formed to a portion including part of the intermediate portion 74C on the front portion 74F side, or including a rear end side of the front portion 74F and part of the intermediate portion 74C on the front portion 74F side.

In plan view, the projection portion 74P projects out to the spacer 56 side of a hypothetical line IL connecting between a boundary of the intermediate portion 74C with the rear portion 74R, and the front portion 74F, in plan view. Namely, in the present exemplary embodiment, the projection portion 74P is configured projecting out to the spacer 56 side of an angled portion formed by the front portion 74F and the intermediate portion 74C. More specifically, the projection portion 74P is an inflected portion (bent portion) formed in a substantially V shape opening forward and toward the vehicle width direction outside in plan view by bending at three bending locations 74B1, 74B2, and 74B3.

Although not illustrated in the drawings, the projection portion 74P overlaps with the spacer 56 in the vertical direction at least in a region from the boundary with the front portion 74F to an apex portion 74PP at the bend of the V shape. In the projection portion 74P, the position of the apex portion 74PP with respect to the spacer 56 is similar to the position of the leading end 62P of the support member 62. Together with the coupling member 72, the projection portion 74P is accordingly disposed at a separation to the spacer 56, and the entire projection portion 74P is disposed offset to the vehicle width direction outside with respect to the spacer 56.

When the pipe 74 of the coupling member 72 rotates (is deformed or displaced) about a front end (a vehicle width direction outer end of the flange 52F) in the direction of arrow R in FIG. 13 in plan view, the projection portion 74P configured as described above swings around to the rear of the supported face 56S of the spacer 56 (see FIG. 14). The projection portion 74P contacts or becomes extremely close to the supported face 56S in this swung around state.

Explanation follows regarding operation of the projection portion 74P of the third exemplary embodiment. As illustrated in FIG. 14, when the coupling member 72 deforms until it impinges on the spacer 56, the projection portion 74P that is integrally formed to the coupling member 72 swings around to the rear of the supported face 56S of the spacer 56. Namely, the projection portion 74P swings around to the vicinity of the rear side of the spacer 56 accompanying rotation of the coupling member 72 about its front side. The spacer 56 accordingly transmits load from the coupling member 72 to the front side member 12 while the supported face 56S is supported from the rear by the projection portion 74P.

In a small overlap collision, shear load on the spacer 56 caused by load received from the coupling member 72 is accordingly supported from the rear by the projection portion 74P. Accordingly, positional displacement of the spacer 56 in the longitudinal direction with respect to the front side member 12, and decoupling of the spacer 56 from the front side member 12, are prevented or effectively suppressed.

The vehicle body front section structure 70 according to the third exemplary embodiment thereby exhibits similar operation to the vehicle body front section structure 10 according to the first exemplary embodiment, and can accordingly obtain similar operation to the vehicle body front section structure 10 according to the first exemplary embodiment. Operation of the coupling member 72, and operation and advantageous effects of the spacer 56 are also basically the same as those in the vehicle body front section structure 10, enabling similar operation to the vehicle body front section structure 10 to be obtained.

In the vehicle body front section structure 70, the projection portion 74P is integrally formed by bending the pipe 74 configuring the coupling member 72, thereby enabling the projection portion 74P, serving as a support member, to be provided without entailing an increase in the number of components.

Fourth Exemplary Embodiment

Figure 15:
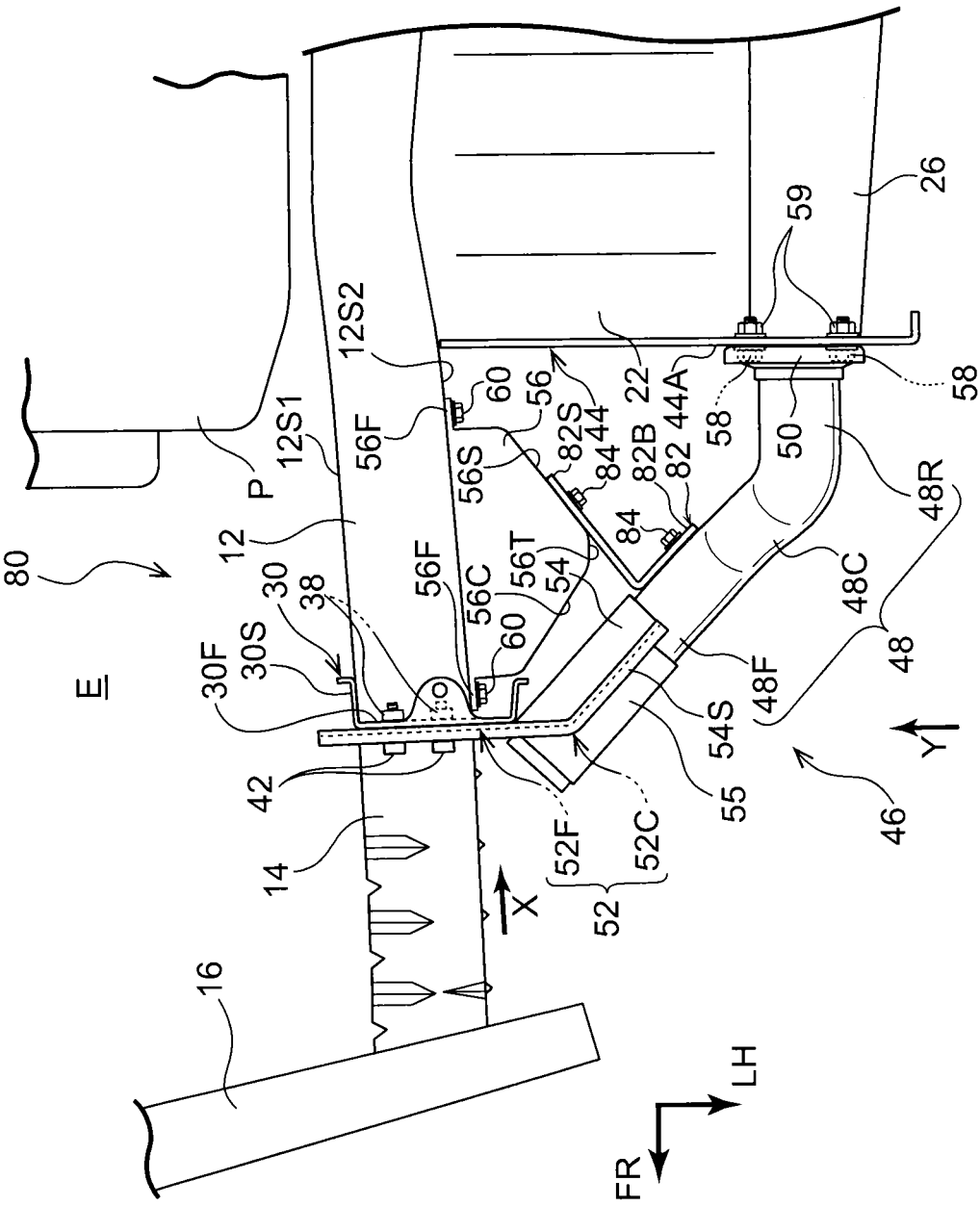
FIG. 15 is an enlarged plan view illustrating relevant portions of a vehicle body front section structure according to a fourth exemplary embodiment of the present invention.

Explanation follows regarding a vehicle body front section structure 80 according to a fourth exemplary embodiment of the present invention, with reference to FIG. 15. Note that components and portions that are basically the same as those of the first or the second exemplary embodiment are allocated the same reference numerals as in the first or the second exemplary embodiment, and explanation and illustration thereof is omitted as appropriate.

FIG. 15 is a plan view corresponding to FIG. 10, illustrating relevant portions of the vehicle body front section structure 80. As illustrated in FIG. 15, the vehicle body front section structure 80 differs from the first exemplary embodiment in the point that a support member 82 is provided in place of the support member 62. Specific explanation follows thereof.

The support member 82 is formed as a substantially L shaped member in plan view. More specifically, the support member 82 is configured by a support plate 82S that stands out from an end portion of a base plate 82B. In the present exemplary embodiment, the support member 82 is formed in an L shape as described above by bending (pressing) sheet metal such as a steel sheet or an aluminum sheet.

The base plate 82B is joined to the front portion 48F (encompassing a portion in the vicinity of the boundary between the front portion 48F and the intermediate portion 48C) of the pipe 48, and the support plate 82S is superimposed with the supported face 56S of the spacer 56 and joined to the spacer 56. The joining structures employ fastening using fasteners including bolts 84.

Explanation follows regarding operation of the support member 82 of the fourth exemplary embodiment. In the vehicle body front section structure 80, the support member 82 couples the coupling member 46 and the spacer 56 together. The spacer 56 accordingly transmits load from the coupling member 46 to the front side member 12 while the supported face 56S is supported from the rear by the support member 82.

Shear load on the spacer 56 due to load received from the coupling member 46 in a small overlap collision is accordingly supported from the rear by the support member 82. Accordingly, positional displacement of the spacer 56 in the longitudinal direction with respect to the front side member 12, and decoupling of the spacer 56 from the front side member 12, are prevented or effectively suppressed.

The vehicle body front section structure 80 according to the fourth exemplary embodiment accordingly exhibits similar operation and advantageous effects to the vehicle body front section structure 10 according to the first exemplary embodiment, with the exception of operation due to disposing the support member 62 at a separation to the spacer 56. Due to sharing common operation with the vehicle body front section structure 10, similar advantageous effects can also be obtained to those of the vehicle body front section structure 10. Operation of the coupling member 46, and operation and advantageous effects of the spacer 56, are also basically the same as those of the vehicle body front section structure 10, thereby enabling similar operation to the vehicle body front section structure 10 to be obtained.

In the first to the fourth exemplary embodiments described above, explanation has been given regarding examples in which the pipe 48 configures the main body of the coupling member 46; however, the present invention is not limited thereto. For example, in place of the pipe portion 48, a coupling member with a main body configured with a closed cross-section structure by joining together plural members, such as a coupling member 102, described later, or a coupling member with a main body configured by (bending) an extrusion molded component, may be employed.

In each of the exemplary embodiments described above, explanation has been given regarding examples in which the rear end of the coupling member 46 is joined to the end plate 44; however the present invention is not limited thereto. For example, as in the coupling member 102, a coupling member may be employed with a rear end joined to the apron upper member 26 or the fender apron 22.

In each of the exemplary embodiments described above, explanation has been given regarding examples in which the front side join portion 52 includes the main panel 54 and the reinforcement panel 55; however, the present invention is not limited thereto. For example, a front side join portion may be employed with a structure in which the pipe 48 (main body) is enclosed by bending a single panel (a structure in which a single panel configures a pair of plate portions). Moreover, for example, a front side join portion may be employed that is only joined to the pipe 48 (main body) from one side. As another example, a front side join portion configured from three or more panels may be employed. Namely, it is sufficient that the front side join portion is joined to the pipe 48 (main body) with the necessary strength for the load received in a small overlap collision.

Moreover, in each of the exemplary embodiments described above, explanation has been given regarding examples in which the pipe 48 of the coupling member 46 includes the front portion 48F serving as a horizontal portion; however, the present invention is not limited thereto. For example, configuration may be made with a coupling member in which a front portion, namely a portion overlapping with the spacer 56 in the vertical direction, includes a pipe that is angled or curved with respect to the length direction of the front side member 12 as viewed from the side.

In each of the exemplary embodiments described above, explanation has been given regarding examples in which the spacer 56 provided to the side face 12S2 of the front side member 12 is fastened thereto; however, the present invention is not limited thereto. For example, the spacer 56 may be joined to the front side member 12 by joining structures using welding, brazing, bonding, or the like. The present invention, in which the spacer is supported from the rear by a support member (projection portion) in a small overlap collision, enables the joining structure to be simplified.

Fifth Exemplary Embodiment

Figure 16:
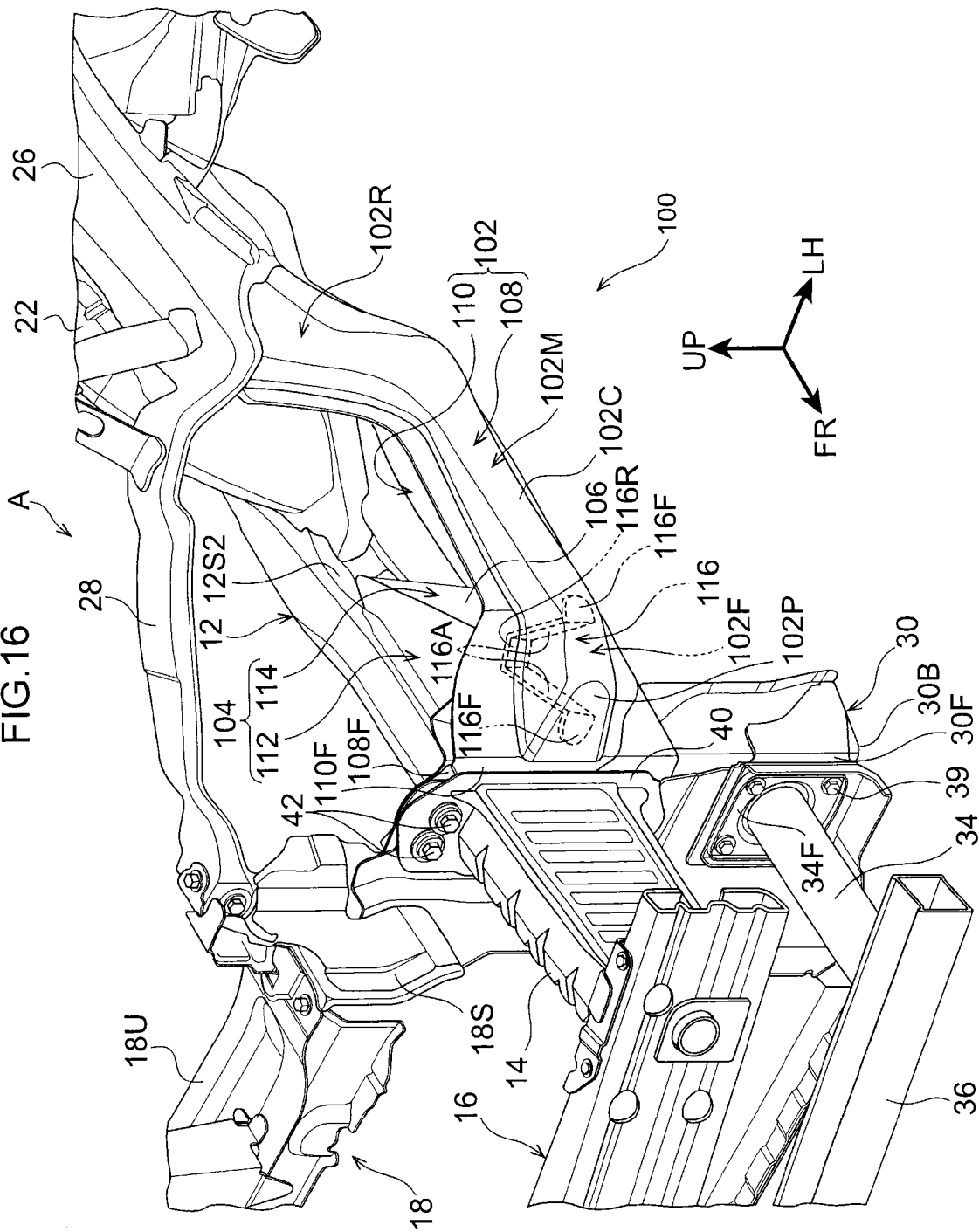
FIG. 16 is an enlarged perspective view illustrating relevant portions of a vehicle body front section structure according to a fifth exemplary embodiment of the present invention.
Figure 17:
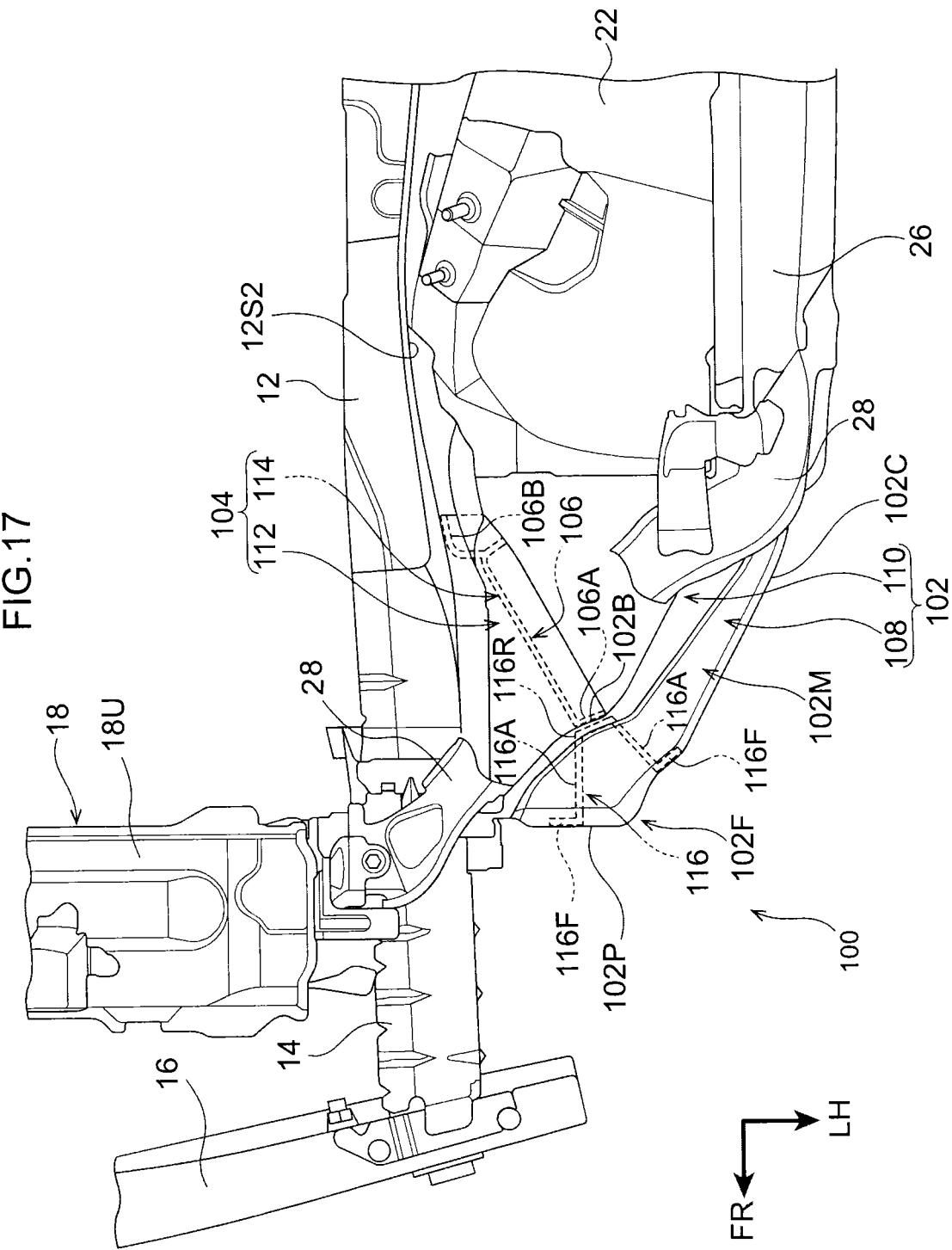
FIG. 17 is an enlarged plan view illustrating relevant portions of a vehicle body front section structure according to the fifth exemplary embodiment of the present invention.

FIG. 16 is a perspective view illustrating configuration of relevant portions of a vehicle body front section structure 100 according to a fifth exemplary embodiment of the present invention. FIG. 17 is a plan view illustrating the vehicle body front section structure 100, and FIG. 18 is a side view illustrating the vehicle body front section structure 100.

Figure 18:
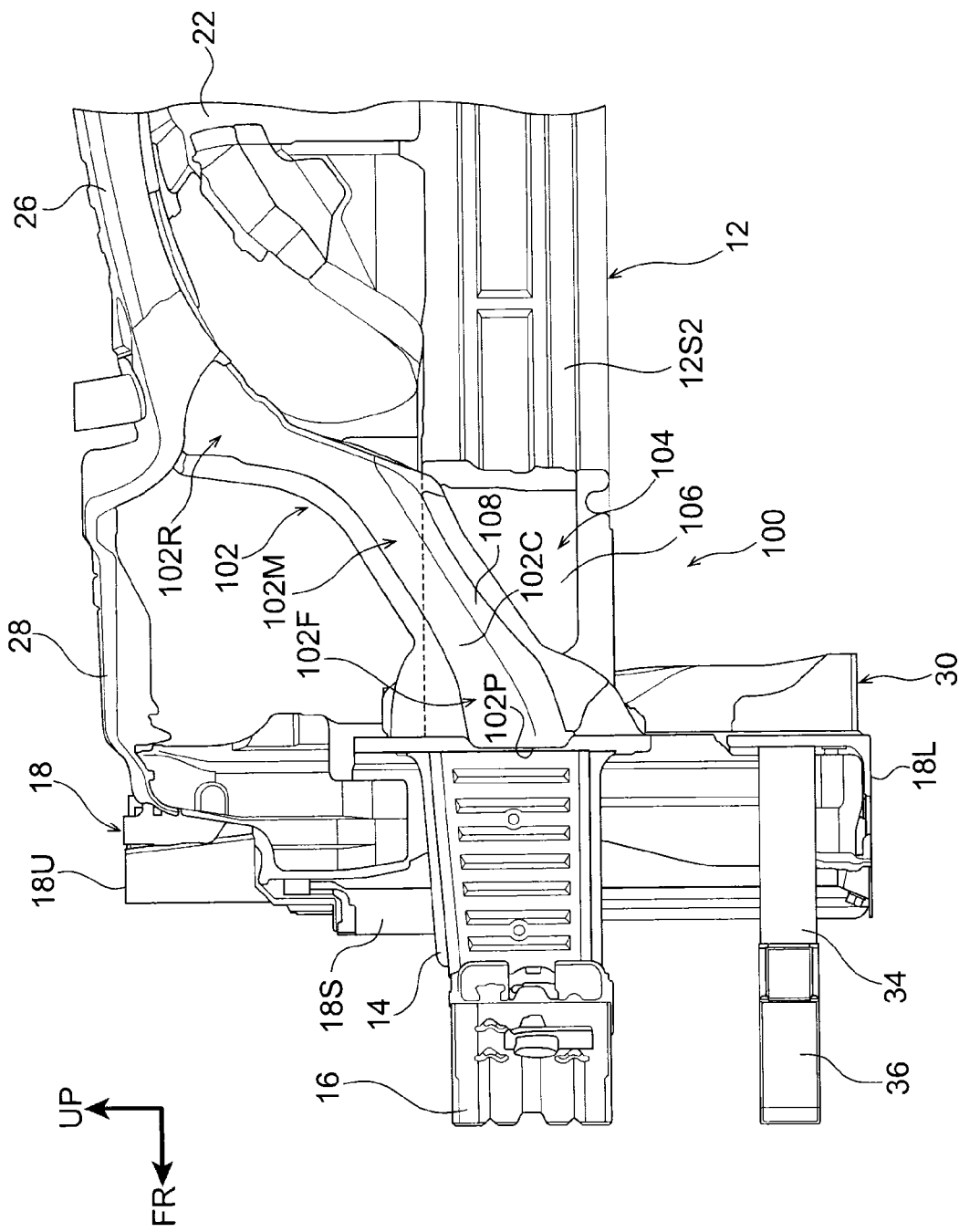
FIG. 18 is an enlarged side view illustrating relevant portions of a vehicle body front section structure according to the fifth exemplary embodiment of the present invention.

As illustrated in FIG. 16 to FIG. 18, the vehicle body front section structure 100 includes a coupling member 102 with a rectangular closed cross-section in place of the coupling member 46 including the pipe 48 with a circular closed cross-section. The vehicle body front section structure 100 moreover includes a spacer (projection member) 104 joined to the coupling member 102 in place of the spacer 56 disposed at a separation to the coupling member 46. Specific explanation follows thereof.

Coupling Member

The coupling member 102 extends out integrally from a front end portion of the apron upper member 26, and a front end portion of the coupling member 102 is fixed to a front portion of the front side member 12. Specifically, the coupling member 102 is formed with a rear portion 102R, an intermediate portion 102M, and a front portion 102F connected in sequence from the rear.

The rear portion 102R of the coupling member 102 extends downward and toward the front from the front end portion of the apron upper member 26. The rear portion 102R of the present exemplary embodiment is inclined at an angle closer to the vertical than to the horizontal, as illustrated in FIG. 18. The intermediate portion 102M extends downward and toward the front from a front end portion of the rear portion 102R. The intermediate portion 102M has an angle of inclination closer to the horizontal than the rear portion 102R as viewed from the side, and is set at an angle of inclination of approximately 45° in the present exemplary embodiment. As illustrated in FIG. 17, the intermediate portion 102M is angled such that in plan view, a front side is closer to the front side member 12 than a rear side in the vehicle width direction.

The front portion 102F of the coupling member 102 is disposed at the same height as the front side member 12 (overlapping in the vertical direction), and is positioned at the vehicle width direction outside of a front portion of the front side member 12. A front end side of the front portion 102F extends toward the vehicle width direction inside, and reaches between the front side member 12 and the crash box 14. A vehicle width direction outside face of the coupling member 102 (in particular of the front portion 102F and the intermediate portion 102M) configures a curved face 102C that curves such that a rear side faces more toward the vehicle width direction outside than a front side.

Supplementary explanation is given regarding the overall structure of the coupling member 102, before proceeding to explanation regarding a joining structure between the front portion 102F and the front side member 12 and the crash box 14. In the coupling member 102, an outer panel 108 with a hat shaped cross-section opening toward the vehicle width direction inside, and an inner panel 110 with a hat shaped cross-section opening toward the vehicle width direction outside (see FIG. 17) are joined together at respective upper and lower flanges. The coupling member 102 is thus formed with a closed cross-section structure with a rectangular cross-section, as described above. At the front portion 102F side of the coupling member 102, the outer panel 108 is configured with a hat shaped cross-section opening in a substantially rear-facing direction, and the inner panel 110 has a flat plate shape joined to the upper and lower flanges of the outer panel 108.

Figure 19:
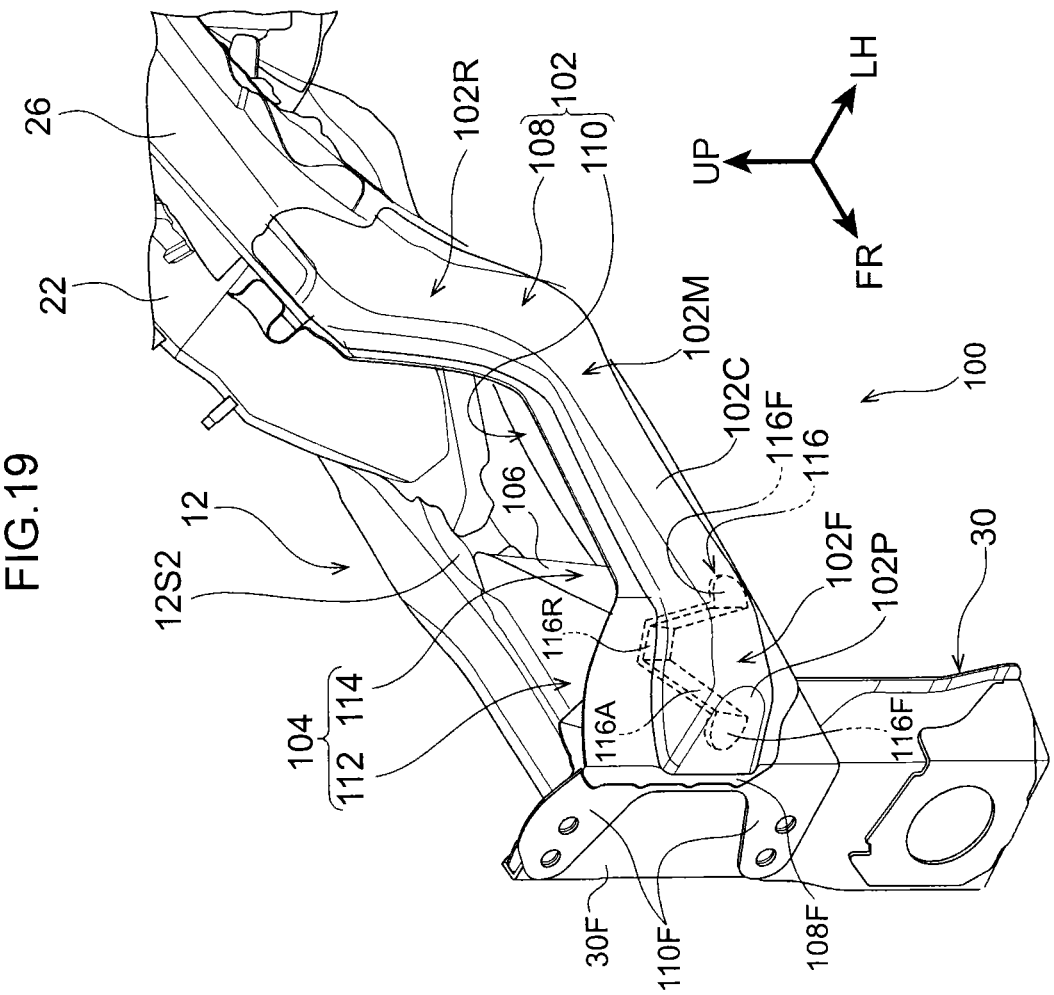
FIG. 19 is a perspective view illustrating relevant portions of a vehicle body front section structure according to the fifth exemplary embodiment of the present invention, from which bumper reinforcement, a crash box, and the like have been removed.

As illustrated in FIG. 19, a flat plate shaped flange 110F extends out toward the vehicle width direction inside from a vehicle width direction inside end portion of the front portion 102F of the inner panel 110. A flange 108F extending out from a vehicle width direction inside end portion of the outer panel 108 is joined to a portion on the vehicle width direction outer end side of the flange 110F from the front.

The plate thickness direction of the flange 110F runs in the longitudinal direction, and an vertical direction intermediate portion of the flange 110F is cut away from the vehicle width direction inside. The flange 110F is interposed between the flange body 30F of the front flange 30 provided to the front side member 12 and the flange body 40F of the rear flange 40 provided to the crash box 14. Moreover, the flange 110F is joined between the flange body 30F and the flange body 40F by fastening together at four fastening locations by screwing together the weld nuts 38 and the bolts 42. The flange 110F of the coupling member 102 corresponds to a joining plate.

A front end of the coupling member 102 described above is positioned further to the front than the front end of the front side member 12. Specifically, as illustrated in FIG. 16 through FIG. 18, the outer panel 108 includes a projection portion 102P projecting out to the front of the flange 108F. A front end of the projection portion 102P is positioned further to the front than the front end of the front side member 12.

Spacer

The vehicle body front section structure 100 includes the spacer 104 that is joined to the front side member 12 and the coupling member 102 respectively. The spacer 104 is, for example, formed in a vertically flattened hollow triangular column shape by joining together plural members formed from sheet metal material. The spacer 104 projects out from the front portion of the front side member 12 toward the vehicle width direction outside. The spacer 104 is, for example, joined to the side face 12S2, this being a vehicle width direction outside wall portion of the front side member 12, by means such as welding or the like.

The spacer 104 includes a load transmission portion 106 angled such that a rear side is further toward the vehicle width direction inside than a front side. The load transmission portion 106 configures a vehicle width direction outside (rear side) wall of the spacer 104. Specifically, the spacer 104 is configured from main portions of an inner panel 112 that is joined to the front side member 12, and an outer panel 114 that is joined to the inner panel 112 and forms a closed cross-section with the inner panel 112. As illustrated in FIG. 17, in plan view the outer panel 114 extends from a high rigidity portion (a location installed with a bulkhead 116), described later, of the coupling member 102, and reaches as far as the location of a join between a rear portion of the spacer 104 and the side face 12S2 of the front side member 12.

The outer panel 114 is configured as a portion of the spacer 104 with high rigidity with respect to rearward load by, for example, configuring the outer panel 114 from a material with greater thickness, or with higher tensile strength, than the inner panel 112. Accordingly, in the present exemplary embodiment, the load transmission portion 106 is configured mainly at the outer panel 114.

A front side join portion 106A is provided at a front end portion of the load transmission portion 106. The front side join portion 106A is bent so as to follow a back face 102B of the front portion 102F of the coupling member 102 (a rear wall portion 116R of the bulkhead 116, described later), and is joined to the back face 102B by means such as welding or bolt fastening. A rear side join portion 106B is provided at a rear end portion of the load transmission portion 106. The rear side join portion 106B is bent so as to follow the side face 12S2 of the front side member 12, and is joined to the side face 12S2 by means such as welding or bolt fastening.

Bulkhead

As illustrated in FIG. 16 and FIG. 17, the bulkhead 116, serving as a reinforcement member, is provided inside the cross-section of the front portion 102F of the coupling member 102. The bulkhead 116 is formed in a hat shape, opening toward the rear in plan view. Specifically, the bulkhead 116 includes the rear wall portion 116R forming the bottom of the hat shape, a pair of arms 116A extending from both vehicle width direction ends of the rear wall portion 116R toward the front, and a pair of left and right front flanges 116F extending from front ends of both arms so as to head away from each other in the vehicle width direction. The rear wall portion 116R is joined to an inner face (front face) of a portion of the inner panel 110 forming the back face 102B of the coupling member 102 by means such as welding.

The pair of front flanges 116F are joined to an inner face (rear face) of a portion of the outer panel 108 configuring the front portion 102F by means such as welding. More specifically, the front flange 116F on the vehicle width direction inside is joined to the inner face at a portion of the outer panel 108 configuring the projection portion 102P. The front flange 116F on the vehicle width direction outside is joined to the inner face at a portion of the outer panel 108 configuring a front portion of the curved face 102C.

The vehicle body front section structure 100 is thus formed with a path along which rearward load input to a front end portion of the coupling member 102 passes through the bulkhead 116 and the load transmission portion 106 of the spacer 104, and is transmitted into the front side member 12. The bulkhead 116 configures a reinforcement structure at a portion where the front portion 102F of the coupling member 102 transmits load to the spacer 104. The bulkhead 116 forms the high rigidity portion at the front portion 102F of the coupling member 102.

The bulkhead 116 may be understood as a portion of the spacer 104 (a front side extension portion of the load transmission portion 106) that transmits load input to the projection portion 102P to the front side member 12, and is independent of the coupling member 102 that transmits load to the apron upper member 26. The front portion 102F of the coupling member 102, the bulkhead 116, and the spacer 104 may also be collectively understood as a member (gusset) for transmitting rearward load input at the vehicle width direction outside of the front side member 12 to the front side member 12.

Other configurations of the vehicle body front section structure 100 according to the present exemplary embodiment, including portions that are not illustrated, have basically the same configuration as in the vehicle body front section structure 10 according to the first exemplary embodiment. Accordingly, the vehicle body front section structure 100 enables basically the same advantageous effects to be obtained from the same operation as in the vehicle body front section structure 10.

In the vehicle body front section structure 100, the load transmission portion 106 of the spacer 104 is joined to the back face 102B of the coupling member 102. Load can accordingly be transmitted from the barrier Br to a side portion of the front side member 12 through the coupling member 102 (bulkhead 116) and the spacer 104 from before the coupling member 102 starts to deform. In particular, since the spacer 104 includes the load transmission portion 106 as described above, when collision load is input to the projection portion 102P of the coupling member 102 from the front, the load can be efficiently transmitted through the load transmission portion 106 to the front side member 12. A fold toward the vehicle width direction inside can be induced in the front side member 12 since stress can be concentrated in the front side member 12 in the vicinity of a rear end of the load transmission portion 106 (at the side of the power unit P).

Moreover, the projection portion 102P of the coupling member 102 is positioned further toward the front than the front end of the front side member 12, and so collision load accordingly acts on the coupling member 102 before acting on the front side member 12 after the crash box 14 has been compressed. The projection portion 102P of the coupling member 102, this being a load input portion, is positioned further to the vehicle width direction outside than the front side member 12, and so the collision load causes moment acting in a direction to fold the front side member toward the vehicle width direction inside. Folding of the front side member 12 toward the vehicle width direction inside is accordingly promoted.

In the vehicle body front section structure 100, a stable displacement mode of the car A with respect to the barrier Br in the vehicle width direction can accordingly be achieved in a short time following the start of a small overlap collision, and this displacement can be further promoted.

The coupling member 102 and the load transmission portion 106 can be prevented from unintentionally moving apart from each other due to collision load since the front end portion of the load transmission portion 106 of the spacer 104 is joined to the back face 102B of the coupling member 102 (the rear wall portion 116R of the bulkhead 116). In a comparative example in which the spacer 104 and the coupling member 102 are not joined together, there is concern of noise being caused by unintended interference between the coupling member and the load transmission portion 106 due to vibration of the vehicle during normal travel. However, in the present exemplary embodiment, the front end portion of the load transmission portion 106 of the spacer 104 is joined to the back face 102B of the coupling member 102 (the rear wall portion 116R of the bulkhead 116) as described above. There is accordingly no unintended interference between the coupling member and the load transmission portion 106 due to vibration of the vehicle during normal travel, enabling the occurrence of noise caused by such interference to be prevented.

In the fifth exemplary embodiment, the spacer 104 is formed in a triangular shape in plan view; however, the present invention is not limited thereto, and the shape settings of the projection member may be modified as appropriate. For example, the projection member may be formed in a trapezoid or semicircle protruding toward the vehicle width direction outside in plan view.

In the fifth exemplary embodiment, the crash box 14, serving as a shock absorbing section, is fixed to the front portion of the front side member 12; however, the present invention is not limited thereto, and a shock absorbing section may be provided integrally to a front portion of a front side member. In such cases, a front end portion of the coupling member is fixed to a portion of the front side member further to the rear side than the shock absorbing section.

In the fifth exemplary embodiment, the bulkhead 116 is attached inside the cross-section of the front portion 102F of the hollow shaped coupling member 102 as a reinforcement member, thereby reinforcing the front portion 102F; however, the present invention is not limited thereto, and configuration may be made without a reinforcement member. In such cases, for example, a front portion of the coupling member may be formed thicker (the plate thickness of the material may be set thicker) than at other locations of the coupling member (at least a location adjacent to the front portion of the coupling member), thereby reinforcing the front portion of the coupling member. Moreover, since the front portion of the coupling member is preferably configured with higher rigidity at least with respect to load in the longitudinal direction, configuration may be made in which one or plural beads extending in the longitudinal direction, for example, are formed to a front portion of the coupling member.

In the fifth exemplary embodiment, the vehicle width direction outside face of the front portion 102F of the coupling member 102 configures the curved face 102C that curves such that the rear side is positioned further to the vehicle width direction outside than the front side. However, the present invention is not limited thereto, and configuration may be made in which the vehicle width direction outside face of the front portion of the coupling member runs along the longitudinal direction, or is angled so as to face more toward the vehicle width direction outside on progression toward the rear side.

In each of the exemplary embodiments described above, explanation has been given regarding examples in which the vehicle body front section structure 10 includes the coupling member 46, 102, and the spacer 56, 104 on both sides in the vehicle width direction; however, the present invention is not limited thereto. For example, configuration may be made in which the coupling member 46, 102, and the spacer 56, 104 are provided on only one side in the vehicle width direction. In such cases, at the side on which the coupling member 46, 102, and the spacer 56, 104 are not provided, a vehicle-mounted component may, for example, double as a spacer, or another structure may be employed to counter small overlap collisions.

In each of the exemplary embodiments described above, explanation has been given regarding examples in which the front flange 30 extends downward and supports the rear end of the pipe member 34 and the front end of the lower member 32. However, the present invention is not limited thereto. In the present invention, explanation has been given regarding examples in which the front flange 30 includes a pair of side walls including the vehicle width direction inside side wall 30S; however, the present invention is not limited thereto. Configuration may be made in which the front flange 30 or an equivalent front flange is not provided with one or both of the pair of side walls.

Obviously, various modifications may be implemented within a range not departing from the spirit of the present invention.

Correspondence relationships between the reference numerals employed in the present specification and the names of each component are shown below.

10 vehicle body front section structure
12 front side member
14 crash box
22 fender apron (fender apron section)
26 apron upper member (fender apron section)
30 front flange
40 rear flange
44 end plate (fender apron section)
46 coupling member
48 pipe (main body)
48F front portion (horizontal portion)
52 front side join portion (joining plate)
52C pipe-joined portion (opposing face portion)
54 main panel (plate member)
55 reinforcement panel (plate member)
62 support member
65, 70, 80, 100 vehicle body front section structure
72 coupling member
74 pipe (main body)
74F front portion (horizontal portion)
74P projection portion (support member)
82 support member
102 coupling member
104 spacer

The invention claimed is:

1. A vehicle body front section structure comprising:
a front side member, with a crash box attached to a vehicle longitudinal direction front side;
a coupling member that includes a closed cross-section structure, the coupling member being interposed between and joined to the crash box and the front side member at the vehicle longitudinal direction front side, the coupling member also joined to a fender apron section at a vehicle longitudinal direction rear side, wherein the closed cross-section structure is located at a first position in a vehicle width direction, and the front side member is located at a second position with respect to the vehicle width direction, wherein with respect to a vehicle longitudinal direction, the first position is closer to an outside of the vehicle than is the second position; and
a spacer that is disposed overlapping in a vehicle vertical direction with the front side member and a front end side of the coupling member as viewed from the side and the spacer is disposed overlapping in the vehicle width direction with the portion of the coupling member configured with a closed cross-section structure as viewed from the front.

2. The vehicle body front section structure of claim 1, wherein the spacer is provided at a vehicle width direction outside side portion of the front side member.

3. The vehicle body front section structure of claim 1, wherein the coupling member includes a horizontal portion extending along the length direction of the front side member from a portion interposed between the crash box and the front side member toward the vehicle longitudinal direction rear as viewed from the side so as to overlap with the front side member and the spacer in the vehicle vertical direction.

4. The vehicle body front section structure of claim 1, wherein:

the coupling member is configured including a main body extending from the fender apron section toward a vehicle longitudinal direction front side portion of the front side member, and a joining plate that is joined to a vehicle longitudinal direction front side of the main body, and is interposed between and joined to the crash box and the front side member; and an opposing face portion is formed at a location of the joining plate that is joined to the main body, such that the opposing face portion juts out in the vehicle vertical direction with respect to the main body and opposes the spacer while overlapping with the spacer in the vehicle vertical direction.

5. The vehicle body front section structure of claim 1, wherein a vehicle longitudinal direction front side portion of the spacer is joined to the portion of the coupling member configured with a closed cross-section structure.

* * * * *